(12) United States Patent
Kendall et al.

(10) Patent No.: US 11,938,689 B2
(45) Date of Patent: Mar. 26, 2024

(54) APPARATUS AND METHOD FOR PROCESSING A COMPOSITE STRUCTURE

(71) Applicant: The Boeing Company, Chicago, IL (US)

(72) Inventors: James R. Kendall, Mount Pleasant, SC (US); Byron James Autry, Charleston, SC (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/522,987

(22) Filed: Nov. 10, 2021

(65) Prior Publication Data

US 2022/0152950 A1    May 19, 2022

Related U.S. Application Data

(60) Provisional application No. 63/115,133, filed on Nov. 18, 2020.

(51) Int. Cl.
   *B29C 70/44*  (2006.01)
   *B29L 31/30*  (2006.01)

(52) U.S. Cl.
   CPC .......... *B29C 70/443* (2013.01); *B29C 70/446* (2013.01); *B29L 2031/3076* (2013.01)

(58) Field of Classification Search
   CPC . B29C 70/443; B29C 70/446; B29C 33/0038; B29C 33/02; B29C 33/76; B29C 33/302; B29C 33/303; B29C 33/304; B29C 33/04; B29C 33/046; B29C 33/048
   See application file for complete search history.

(56) References Cited

U.S. PATENT DOCUMENTS

| | | | |
|---|---|---|---|
| 2,456,513 | A | 12/1948 | Johnson |
| 8,016,970 | B2 | 9/2011 | Dull et al. |
| 10,001,365 | B2 | 6/2018 | Smith et al. |

(Continued)

FOREIGN PATENT DOCUMENTS

| | | |
|---|---|---|
| AU | 2018267651 | 6/2019 |
| CA | 2872026 | 7/2015 |
| DE | 10 2017107908 | 10/2018 |

OTHER PUBLICATIONS

Netherlands Patent Office, Search Report and Written Opinion, App. No. NL 2027434 (dated Jul. 13, 2021).

(Continued)

*Primary Examiner* — Yunju Kim
(74) *Attorney, Agent, or Firm* — Walters & Wasylyna LLC

(57) ABSTRACT

An apparatus for processing a composite structure includes a first processing-tool and a second processing-tool that are movable between an open position, in which the first processing-tool and the second processing-tool are separated from each other, and a closed position, in which the first processing-tool and the second processing-tool are configured to be sealed to each other. In the closed position, the first processing-tool and the second processing-tool are configured to be sealed to a mandrel-tool, located between the first processing-tool and the second processing-tool and supporting the composite structure. In the closed position, the first processing-tool, the second processing-tool, and the mandrel-tool form a vessel, configured to apply at least one of pressure and heat to the composite structure.

25 Claims, 23 Drawing Sheets

(56) References Cited

U.S. PATENT DOCUMENTS

| | | | |
|---|---|---|---|
| 2007/0080481 A1* | 4/2007 | Kismarton | B29C 70/44 |
| | | | 425/389 |
| 2010/0154990 A1* | 6/2010 | Brennan | B29C 33/485 |
| | | | 156/285 |
| 2010/0155984 A1 | 6/2010 | Hollensteiner et al. | |
| 2017/0036310 A1* | 2/2017 | Matsen | B29C 70/549 |
| 2018/0186110 A1* | 7/2018 | Koyanagi | B22F 3/115 |
| 2019/0275753 A1 | 9/2019 | Kendall et al. | |
| 2020/0094490 A1* | 3/2020 | Shewchuk | B29C 70/342 |
| 2020/0238638 A1* | 7/2020 | Toriyama | B29C 44/445 |
| 2020/0331634 A1 | 10/2020 | Knutson et al. | |
| 2021/0206125 A1* | 7/2021 | Scarfe | B29C 70/44 |

OTHER PUBLICATIONS

Netherlands Patent Office, Search Report and Written Opinion, App. No. NL 2027434 (dated Jul. 9, 2021).

European Patent Office, Extended European Search Report, App. No. 21207518.8 (dated Mar. 23, 2022).

European Patent Office, Extended European Search Report, App. No. 21207519.6 (dated Apr. 22, 2022).

* cited by examiner

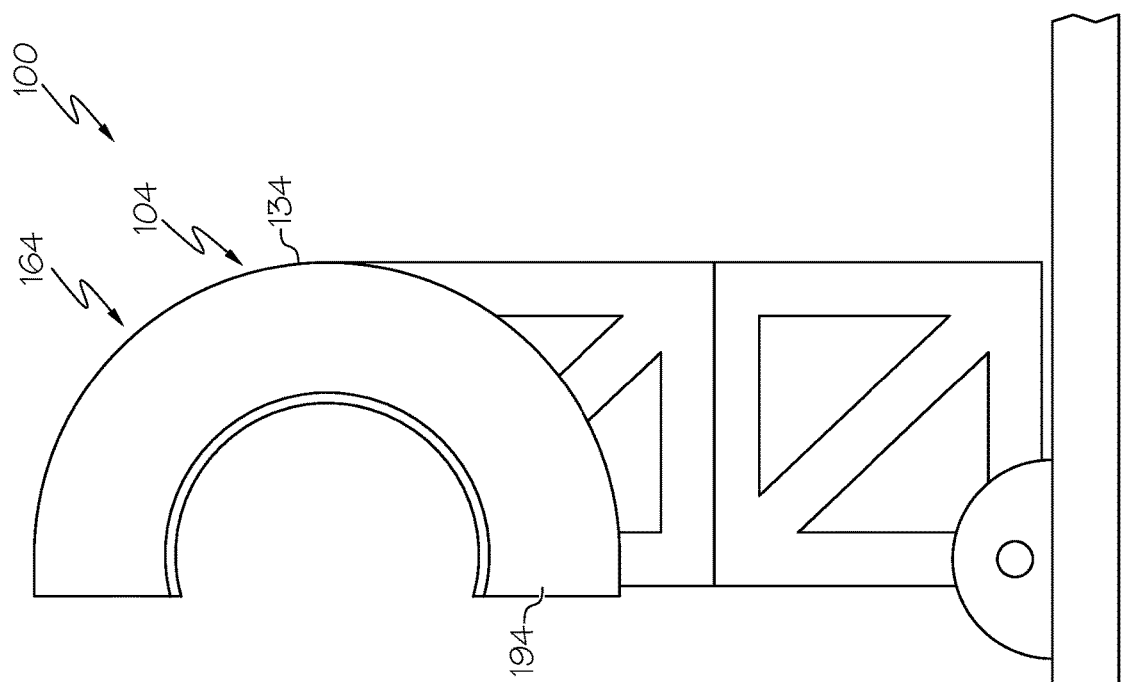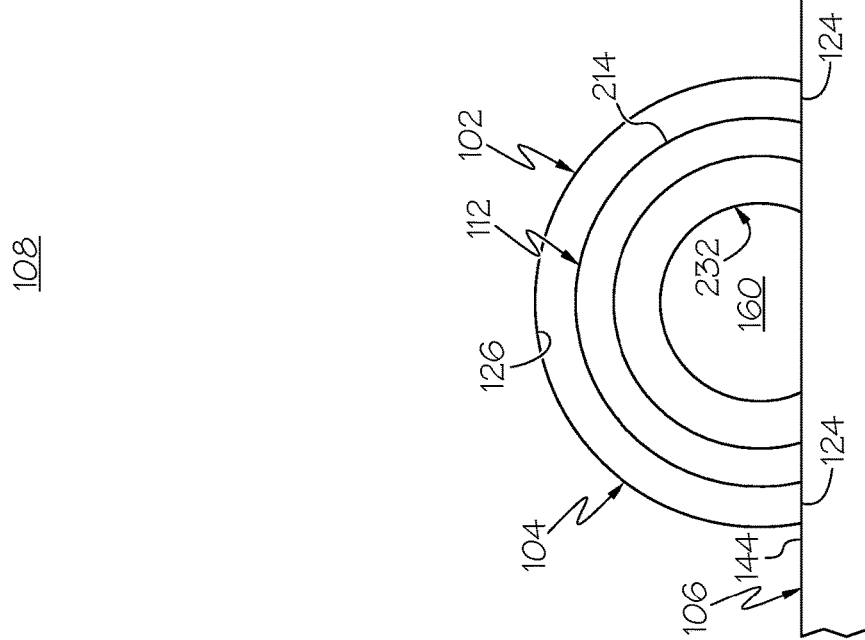
FIG. 7

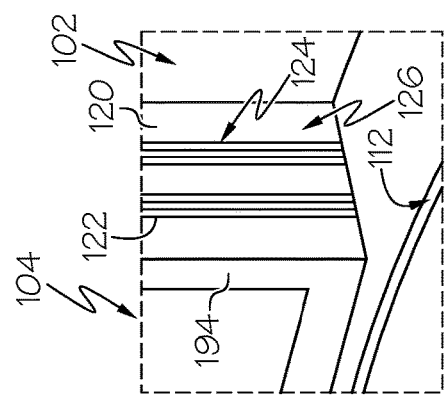
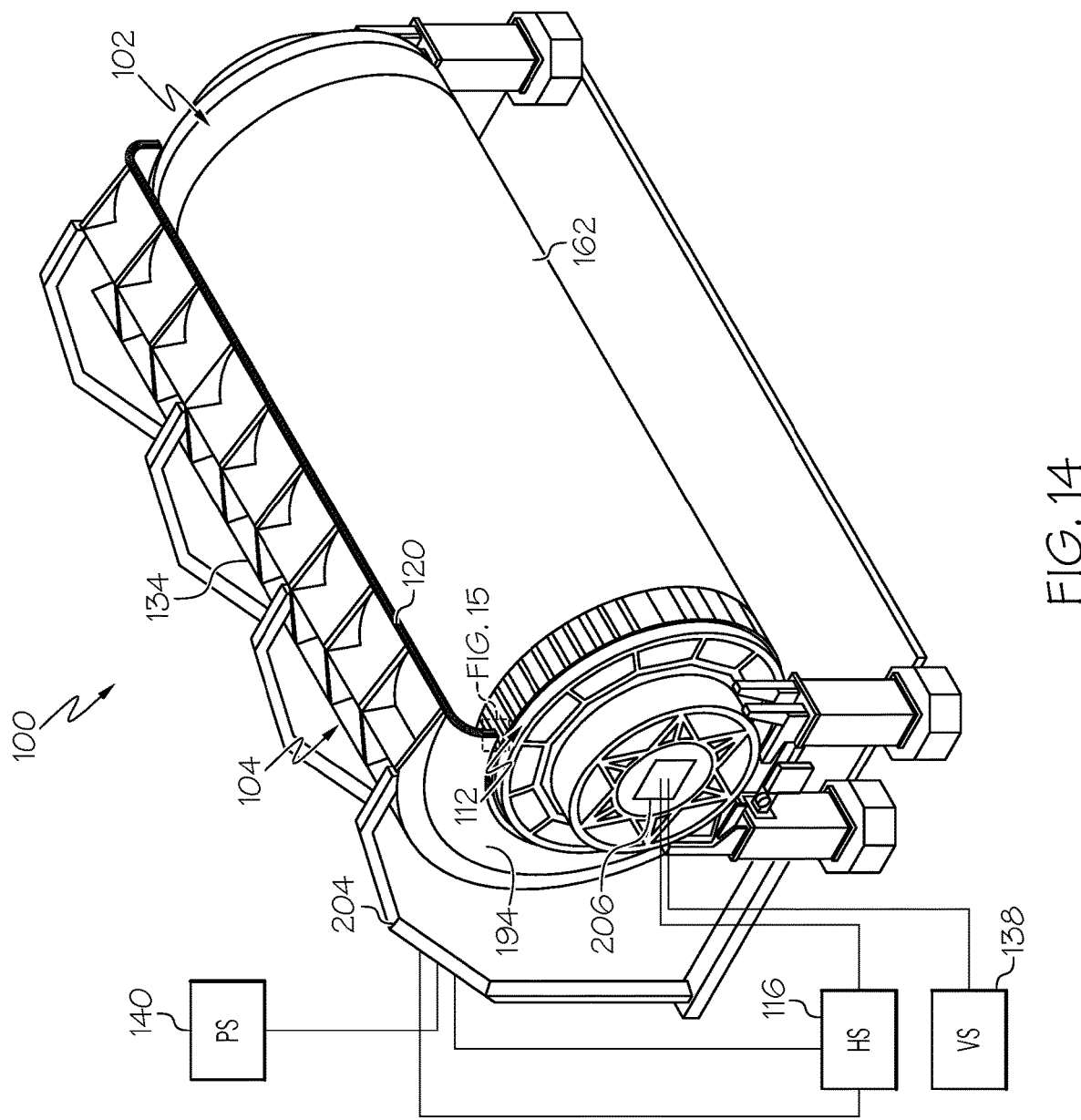

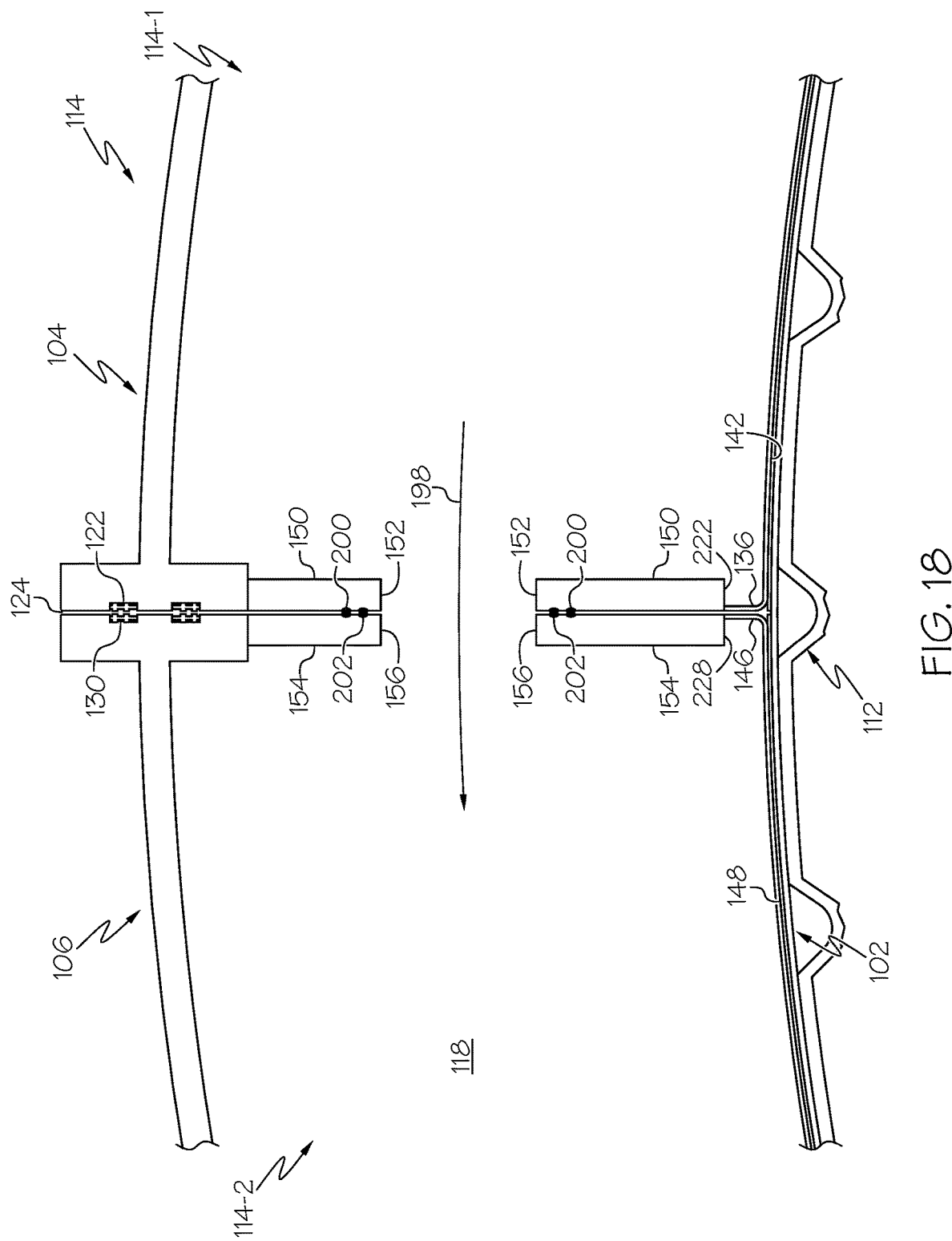

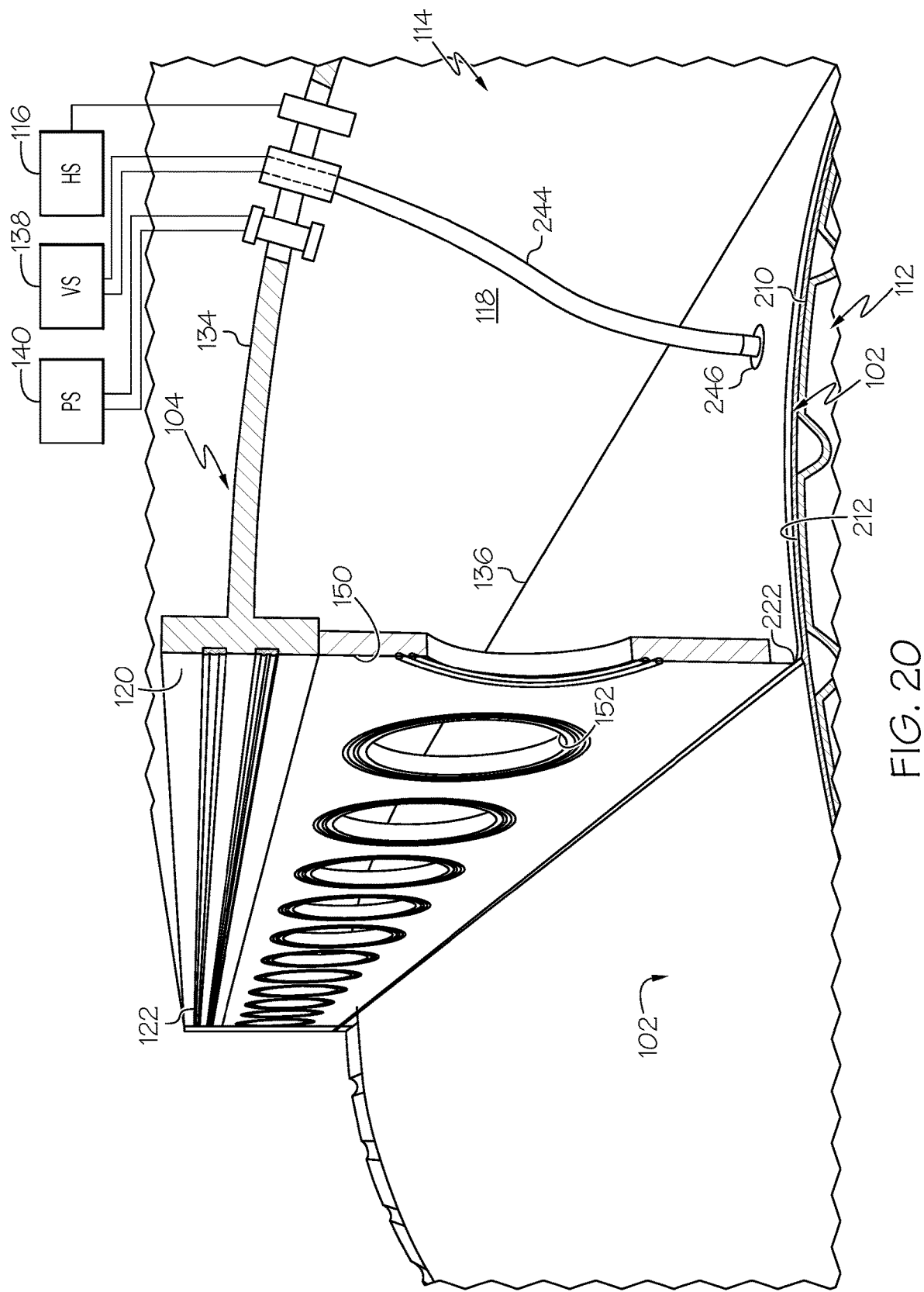

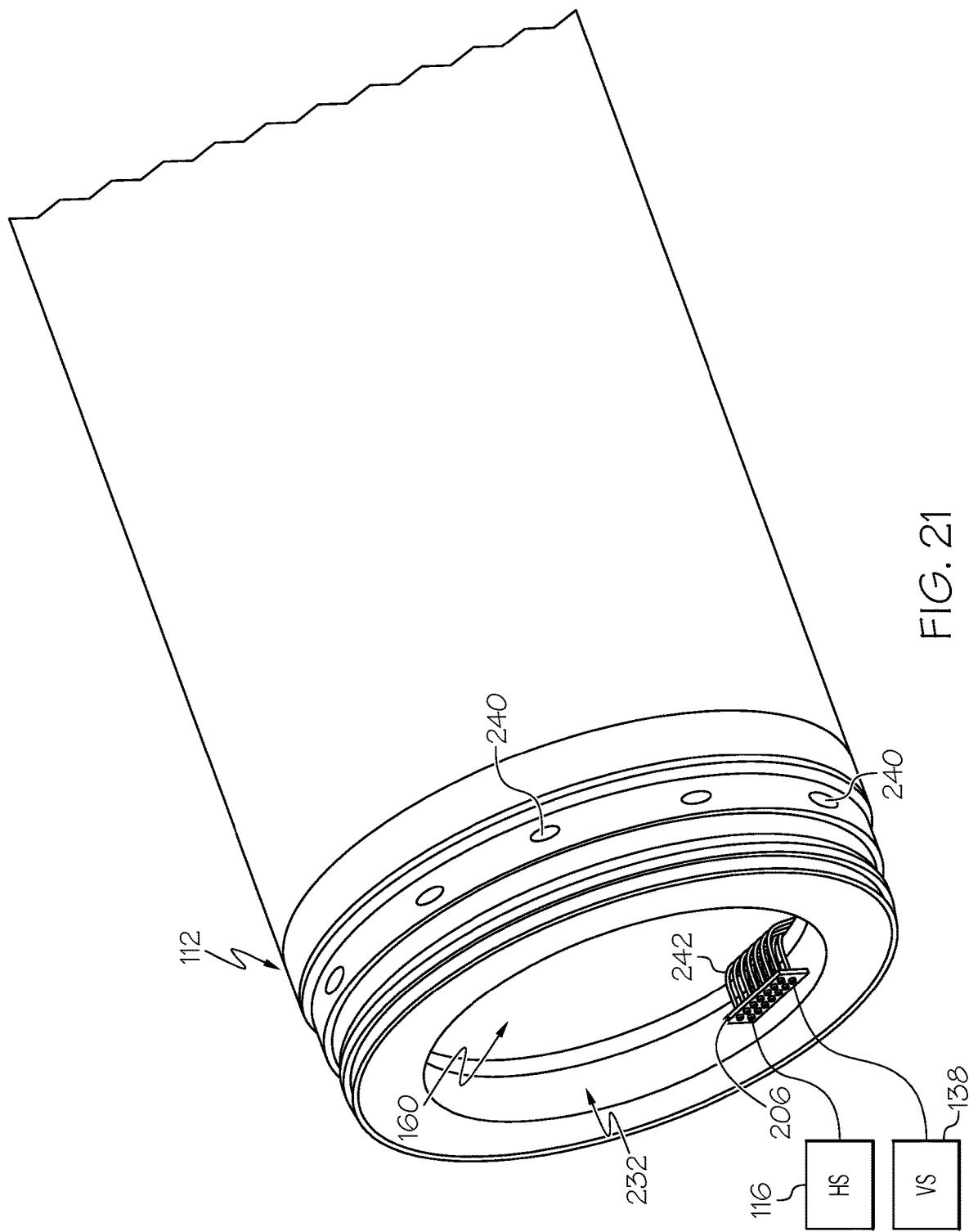

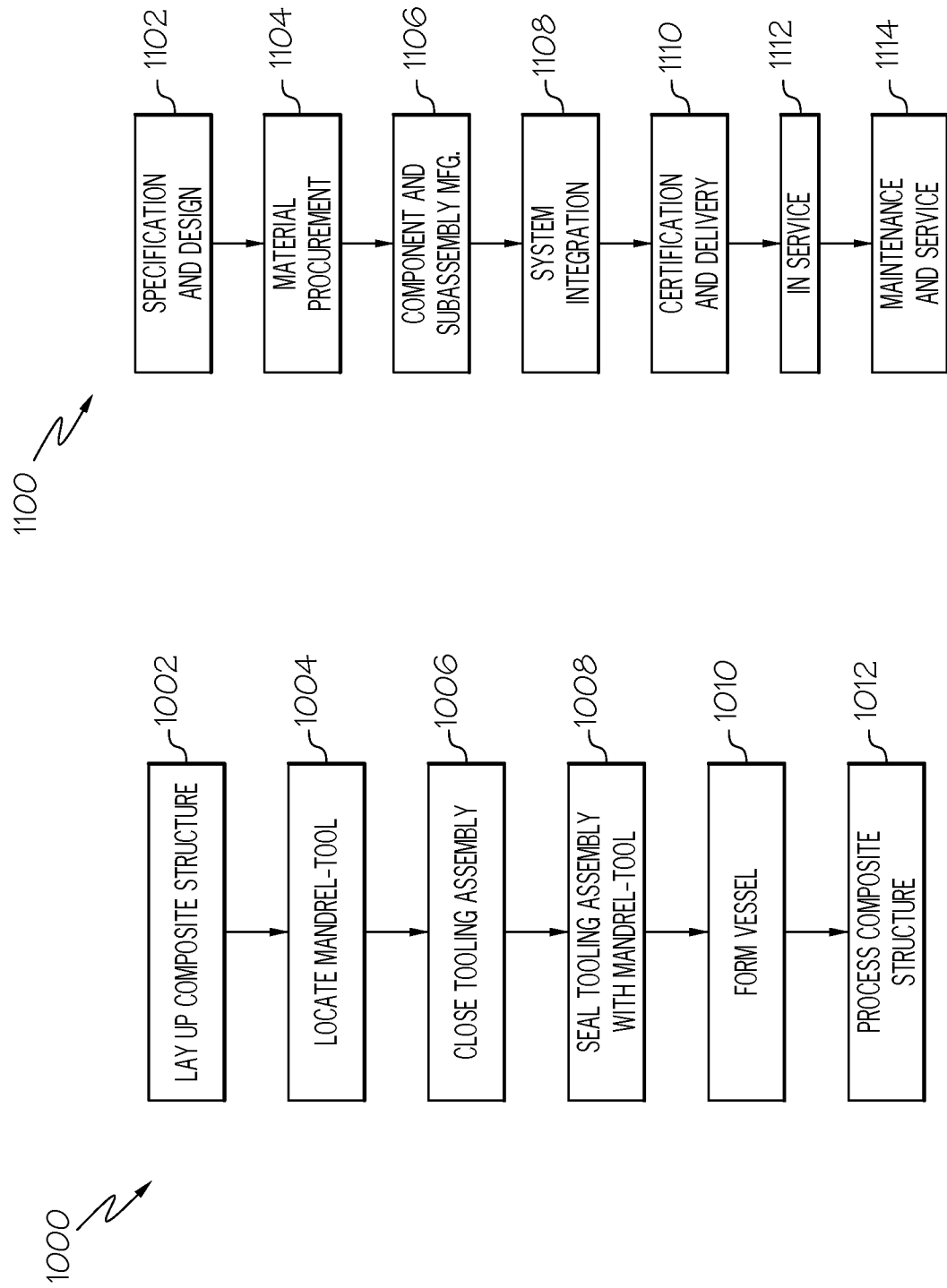

APPARATUS AND METHOD FOR PROCESSING A COMPOSITE STRUCTURE

PRIORITY

This application claims priority from U.S. Ser. No. 63/115,133 filed on Nov. 18, 2020.

FIELD

The present disclosure relates generally to fabricating composite materials and, more particularly, to apparatuses and methods for processing composite structures.

BACKGROUND

Composite components are typically processed within an autoclave that applies heat and pressure to the component or an oven that applies heat to the component. However, there are several disadvantages to conventional autoclave and oven processing techniques, particularly when processing large composite components, such as aircraft structures. For example, conventional autoclaves and ovens require a significant amount of floor space in a manufacturing facility, which increases cost. Furthermore, conventional autoclaves and ovens require time to heat up and cool down between processing cycles, which increases cycle time and cost. Conventional autoclaves and ovens also typically require manual installation and removal of vacuum hoses and temperature sensors between cycles, which further increases cycle time and cost. Additionally, conventional processing techniques often require application of consumable materials, such as bagging, which further increases cost and cycle time. Further, conventional processing techniques often require huge volumes of heated gas, which further increases processing costs, equipment costs, and cycle time. Accordingly, those skilled in the art continue with research and development efforts in the field of composite processing and, as such, apparatuses and methods intended to address the above-identified concerns would find utility.

SUMMARY

The following is a non-exhaustive list of examples, which may or may not be claimed, of the subject matter according to the present disclosure.

In an example, a disclosed apparatus for processing a composite structure includes a first processing-tool and a second processing-tool that are movable between an open position, in which the first processing-tool and the second processing-tool are separated from each other, and a closed position, in which the first processing-tool and the second processing-tool are configured to be sealed to each other. In the closed position, the first processing-tool and the second processing-tool are configured to be sealed to a mandrel-tool, located between the first processing-tool and the second processing-tool and supporting the composite structure. In the closed position, the first processing-tool, the second processing-tool, and the mandrel-tool form a vessel, configured to apply at least one of pressure and heat to the composite structure.

In another example, the disclosed apparatus for processing a composite structure includes a mandrel-tool, configured to support the composite structure during processing. The apparatus includes a tooling assembly, movable relative to the mandrel-tool between an open position and a closed position. The apparatus includes an interface-seal, configured to seal the tooling assembly and the mandrel-tool together to form a vessel, surrounding the composite structure, in the closed position.

In another example, the disclosed apparatus for processing a composite structure includes a tooling assembly, configured to form a sealed vessel with a mandrel-tool and configured to apply at least one of pressure and heat to the composite structure, supported by the mandrel-tool.

In an example, a disclosed method of processing a composite structure includes steps of: (1) positioning a first processing tool of a tooling assembly and a second processing-tool of the tooling assembly from an open position, in which the first processing-tool and the second processing-tool are spaced apart, to a closed position, in which the first processing-tool and the second processing-tool are sealed to each other and are sealed to a mandrel-tool, supporting the composite structure, to form a vessel that surrounds the composite structure; and (2) processing the composite structure.

In another example, the disclosed method of processing a composite structure includes steps of: (1) sealing a first processing-tool to a mandrel-tool, supporting the composite structure; (2) sealing a second processing-tool to the first processing tool and to the mandrel-tool; and (3) forming a vessel, surrounding the composite structure, with the first-processing tool, the second processing-tool, and the mandrel-tool.

In another example, the disclosed method of processing a composite structure includes steps of: (1) locating a mandrel-tool, supporting the composite structure, on a second processing-tool; (2) sealing a first processing-tool to the second processing tool and to the mandrel-tool; and (3) forming a vessel, surrounding the composite structure, with the first-processing tool, the second processing-tool, and the mandrel-tool.

Other examples of the disclosed system, apparatus, and method will become apparent from the following detailed description, the accompanying drawings, and the appended claims.

BRIEF DESCRIPTION OF THE DRAWINGS

FIG. 7 is a schematic, end view of an example of the apparatus;

FIG. 14 is a schematic, perspective view of an example of the first processing-tool;

FIG. 15 is a schematic, perspective view of an example of a sealing interface of the first processing-tool of FIG. 14;

FIG. 18 is a schematic, sectional view of an example of a portion of the first processing-tool and the second processing-tool;

FIG. 20 is a schematic, sectional, perspective view of an example of a portion of the first processing-tool;

FIG. 21 is a schematic, perspective view of a portion of a mandrel-tool of the apparatus;

FIG. 25 is a flow diagram of an example of a method of processing a composite structure;

FIG. 26 is a flow diagram of an aircraft manufacturing and service methodology.

DETAILED DESCRIPTION

Figure 1:
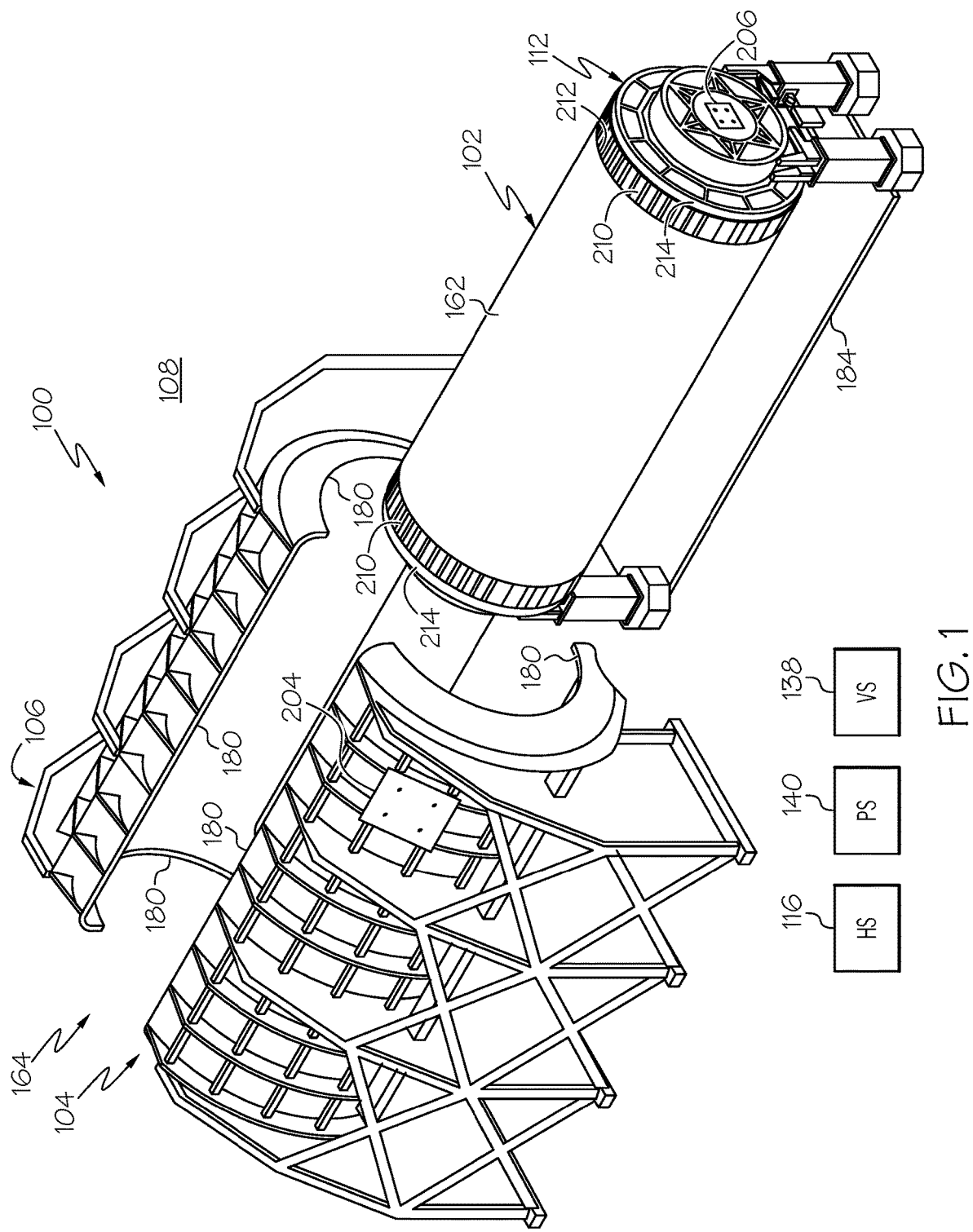
FIG. 1 is a schematic, perspective view of an example of an apparatus for processing a composite structure.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

The present disclosure recognizes that current techniques employed to manufacture large composite structures impose primarily serial flow to processing the composite structure. For example, current autoclave processing typically involves a series of operations performed along the processing flow path that include: (1) a bagging operation; (2) transfer of a mandrel, supporting the composite structure, from a transport cart to an autoclave compatible cart for curing; (3) installation of vacuum hoses between the autoclave and the mandrel; (4) performance of at least one time-consuming leak check of the system; (5) heat up and cool down of the autoclave; (6) removal of the mandrel from the autoclave; (7) removal of the vacuum hoses; (8) transfer of the mandrel back to the transport cart; and (9) a debagging operation. Conventional processing techniques often require very large volumes of heated gas (e.g., air), which increases processing costs and the cost of the equipment needed for the autoclave, such as structure to react internal pressures and large volumes of gas. The present disclosure also recognizes that this methodology imposes limits on cycle time and cost reduction associated with composite processing.

Referring generally to FIGS. 1-24, by way of examples, the present disclosure is directed to an apparatus 100 for processing a composite structure 102. The apparatus 100 is configured to perform any one of a variety of composite processing operations. In one or more examples, the apparatus 100 is configured to compact the composite structure 102 via application of compacting pressure within a sealed vessel 114. In one or more examples, the apparatus 100 is configured to debulk the composite structure 102 via a combination of application of low to moderate debulking heat and application of low to moderate debulking pressure within the sealed vessel 114. In one or more examples, the apparatus 100 is configured to cure the composite structure 102 via a combination of application of moderate to high curing heat and application of moderate to high curing pressure within the sealed vessel 114. Accordingly, the apparatus 100 performs the function of an autoclave or an oven without the disadvantages connected to use of conventional autoclave and oven processing techniques.

Figure 2:
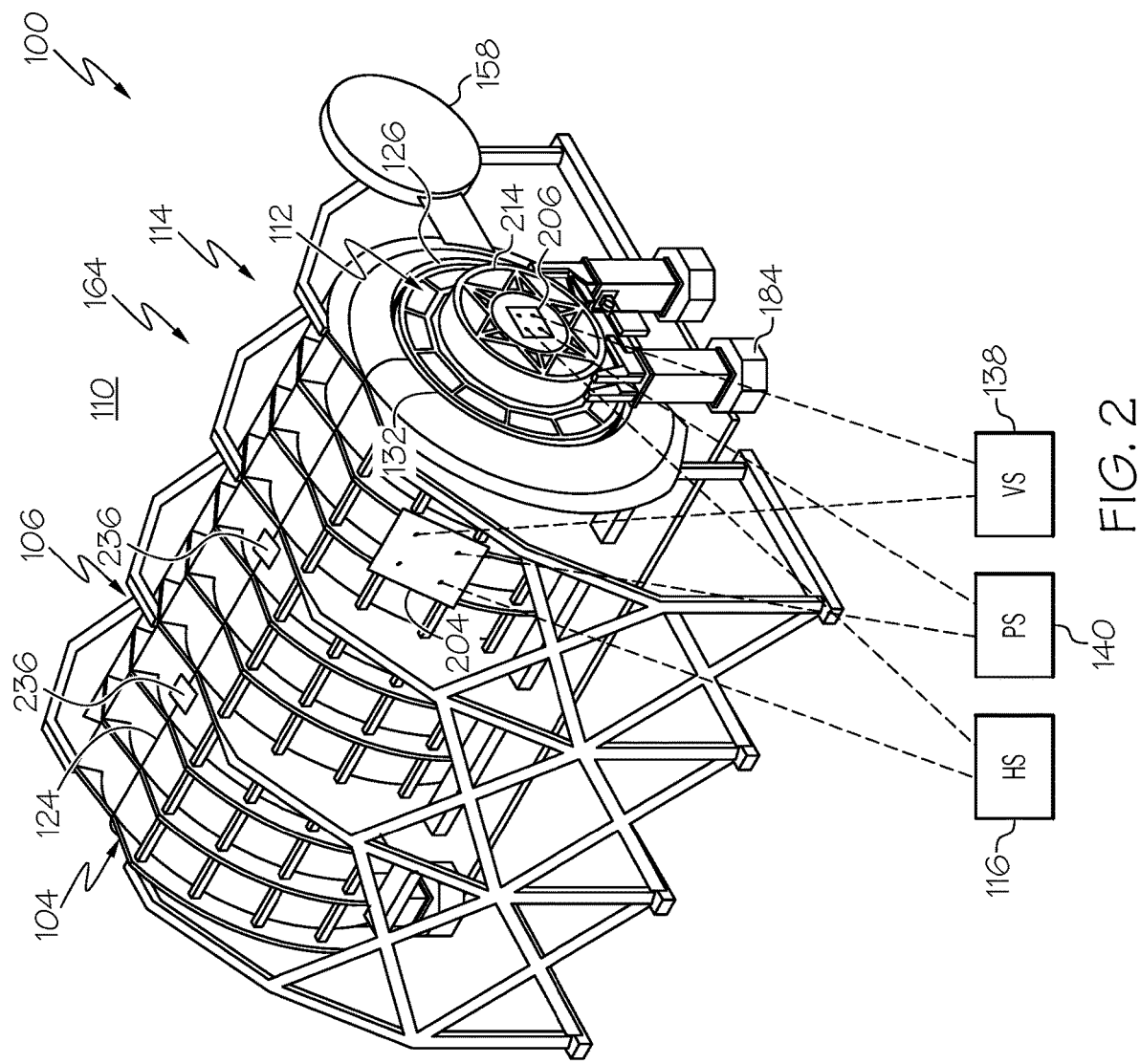
FIG. 2 is a schematic, perspective view of an example of the apparatus.

Referring to FIGS. 1 and 2, in one or more examples, the apparatus 100 includes a tooling assembly 164. In one or more examples, the tooling assembly 164 includes a first processing-tool 104. In one or more examples, the tooling assembly 164 also includes a second processing-tool 106.

In one or more examples, the apparatus 100 also includes a mandrel-tool 112. The mandrel-tool 112 is configured to support the composite structure 102, such as during layup and processing. The mandrel-tool 112 may be commonly referred to as a layup mandrel.

In one or more examples, the mandrel-tool 112 is movable relative to the tooling assembly 164. In one or more examples, the tooling assembly 164 is movable relative to the mandrel-tool 112. In one or more examples, the tooling assembly 164 is movable relative to the mandrel-tool 112 and the mandrel-tool 112 is movable relative to the tooling assembly 164.

In one or more examples, the tooling assembly 164 and the mandrel-tool 112 are configured to form the sealed vessel 114 (FIG. 2). In one or more examples, as illustrated in FIGS. 1 and 2, the vessel 114 (FIG. 2) is formed by sealing the first processing-tool 104 and the second processing-tool 106 together along a first interface 124 (FIG. 2) via a portion of an interface-seal 180 (FIG. 1), sealing ends of the first process-tool 104 around a portion of a perimeter of opposing ends of the mandrel-tool 112 along a second interface 126 (FIG. 1) via another portion of the interface-seal 180, and sealing ends of the second process-tool 106 around another portion of the perimeter of opposing ends of the mandrel-tool 112 along a third interface 132 (FIG. 1) via another portion of the interface-seal 180.

Accordingly, the disclosed apparatus 100 enables end portions 214 of the mandrel-tool 112 to extend beyond the tooling assembly 164 and to be situated outside of the vessel 114. The disclosed apparatus 100 also enables a processing cart 184 that supports the mandrel-tool 112 during processing to be situated outside of the vessel 114 during processing. Situating a portion of the mandrel-tool 112 and the processing cart 184 outside of the vessel 114 advantageously reduces the size required for the vessel 114, reduces an internal volume of the vessel 114, and reduces the time and energy required for processing the composite structure 102.

In one or more examples, the tooling assembly 164 is movable between an open position 108 (FIG. 1) and a closed position 110 (FIG. 2). In the open position 108, the first processing-tool 104 and the second processing-tool 106 of the tooling assembly 164 are positioned in such an arrangement that the mandrel-tool 112, supporting the composite structure 102, can be appropriately located between the first processing-tool 104 and the second processing-tool 106 for processing. In the closed position 110, the first processing-tool 104 and the second processing-tool 106 of the tooling assembly 164 are positioned in such an arrangement to hermetically seal the tooling assembly 164 and the mandrel-tool 112 together to form the vessel 114.

The vessel 114 surrounds the composite structure 102 during processing. The vessel 114 is formed by an outer surface 210 (FIG. 1) of the mandrel-tool 112, the first processing-tool 104, and the second processing-tool 106. The vessel 114 is sealed via the interface-seal 180 (FIG. 1) that is in direct contact with the outer surface 210 of opposing end portions 214 of the mandrel-tool 112, the first processing-tool 104, and the second processing-tool 106 when the tooling assembly 164 is in the closed position 110 (FIG. 2). In other words, the mandrel-tool 112, the first processing-tool 104, and the second processing-tool 106 form a perimeter of the vessel 114 along the interface-seal 180. With the vessel 114 formed and sealed around the composite structure 102, the tooling assembly 164 is configured to apply at least one of pressure and heat to the composite structure 102, supported by the mandrel-tool 112.

Accordingly, the disclosed apparatus 100 advantageously reduces the volume of gas 118 (FIGS. 5, 6 and 9-11), such as heated and/or pressurized gas, located within and bound by the vessel 114 compared to a conventional autoclave, which reduces processing costs and cycle times associated with processing a composite and the cost of the structure of the tooling assembly 164 needed to react to the internal pressure. For example, in a conventional autoclave, exterior walls and door of the autoclave form the pressure vessel, which needs to be sufficiently large to contain a mandrel, supporting a composite, and an entirely of a processing cart used to support the mandrel during processing of the composite. In contrast, the disclosed apparatus 100 utilizes the mandrel-tool 112 to form a structural component of the vessel 114. Thus, the mandrel-tool 112 serves a dual function of supporting the composite structure 102 (FIG. 1) (e.g., a composite preform) and forming a portion of the vessel 114 used to process the composite structure 102.

In one or more examples, the apparatus 100 includes a heating system ("HS") 116. The heating system 116 is configured to generate heat used during the processing of the composite structure 102. In one or more examples, the heating system 116 heats the gas 118 (FIGS. 5, 6 and 9-11) located within the vessel 114. In one or more examples, the heating system 116 heats at least one of the first processing-tool 104 and the second processing-tool 106 of the tooling assembly 164. In one or more examples, the heating system 116 heats the mandrel-tool 112.

In one or more examples, the apparatus 100 includes a pressurization system ("PS") 140. The pressurization system 140 is used to generate positive pressure used during the processing of the composite structure 102. The positive pressure acts on the composite structure 102 (FIG. 1) during processing and applied a compressive force to consolidate the composite structure 102. In one or more examples, the pressurization system 140 pressurizes the gas 118 (FIGS. 5, 6 and 9-11) located within the vessel 114.

In one or more examples, the apparatus 100 includes a vacuum system ("VS") 138. The vacuum system 138 is used to generate negative pressure used during the processing of the composite structure 102. As is described in more detail herein, the vacuum system 138 is configured to evacuate gas located between the outer surface 210 of the mandrel-tool 112 and one of a conformable membrane (e.g., a first conformable membrane 136 (FIGS. 6, 10 and 11) and/or a second conformable membrane 146 (FIG. 6) or compression bagging (e.g., compression bagging 162 (FIGS. 5 and 9)) that surrounds an outer surface 212 (FIG. 1) of the composite structure 102.

In one or more examples, the apparatus 100 includes a combination of two or more of the heating system 116, the pressurization system 140, and the vacuum system 138 to generate a combination of heat, positive pressure, and negative pressure used during the processing of the composite structure 102.

Thus, in the various examples disclosed herein, the tooling assembly 164 is opened to situate the mandrel-tool 112 and closed to form the vessel 114 that surrounds the composite structure 102 for processing the composite structure 102 in place of a conventional autoclave or oven processing technique. The apparatus 100 advantageously reduces the size of processing equipment and improves cycle times and costs associated with processing the composite structure 102 compared to conventional autoclave and oven processing techniques. The apparatus 100 also advantageously provides for an increase in throughput, a reduction in recurring cost, and flexibility in facility layout.

Referring generally to FIGS. 1-11, in one or more examples, the first processing-tool 104 and the second processing-tool 106 are movable between the open position 108 (FIGS. 1, 3 and 7) and the closed position 110 (FIGS. 2, 4-6 and 7-11). In the open position 108, the first processing-tool 104 and the second processing-tool 106 are separated from each other such that the mandrel-tool 112, supporting the composite structure 102, is capable of being appropriately located for processing, such as between the first processing-tool 104 and the second processing-tool 106. In the closed position 110, at least two of the first processing-tool 104, the second processing-tool 106, and the mandrel-tool 112 are configured to be hermetically sealed to each other to form the vessel 114 around the composite structure 102.

In one or more examples, the vessel 114 is a sealed chamber surrounding and enclosing the composite structure 102 for processing. The vessel 114 is configured to apply at least one of pressure and heat to the composite structure 102.

In one or more examples, the first processing-tool 104 is movable relative to the second processing-tool 106. In one or more examples, the second processing-tool 106 is movable relative to the first processing-tool 104. In one or more examples, the first processing-tool 104 and the second processing-tool 106 are movable relative to each other.

In one or more examples, movement of the first processing-tool 104 and/or the second processing-tool 106 relative to each other and/or the mandrel-tool 112 is performed automatically, such as by computer control using a drive mechanism that is configured to move at least one of the first processing-tool 104 and the second processing-tool 106 in one or more directions between the open position 108 and the closed position 110.

Figure 3:
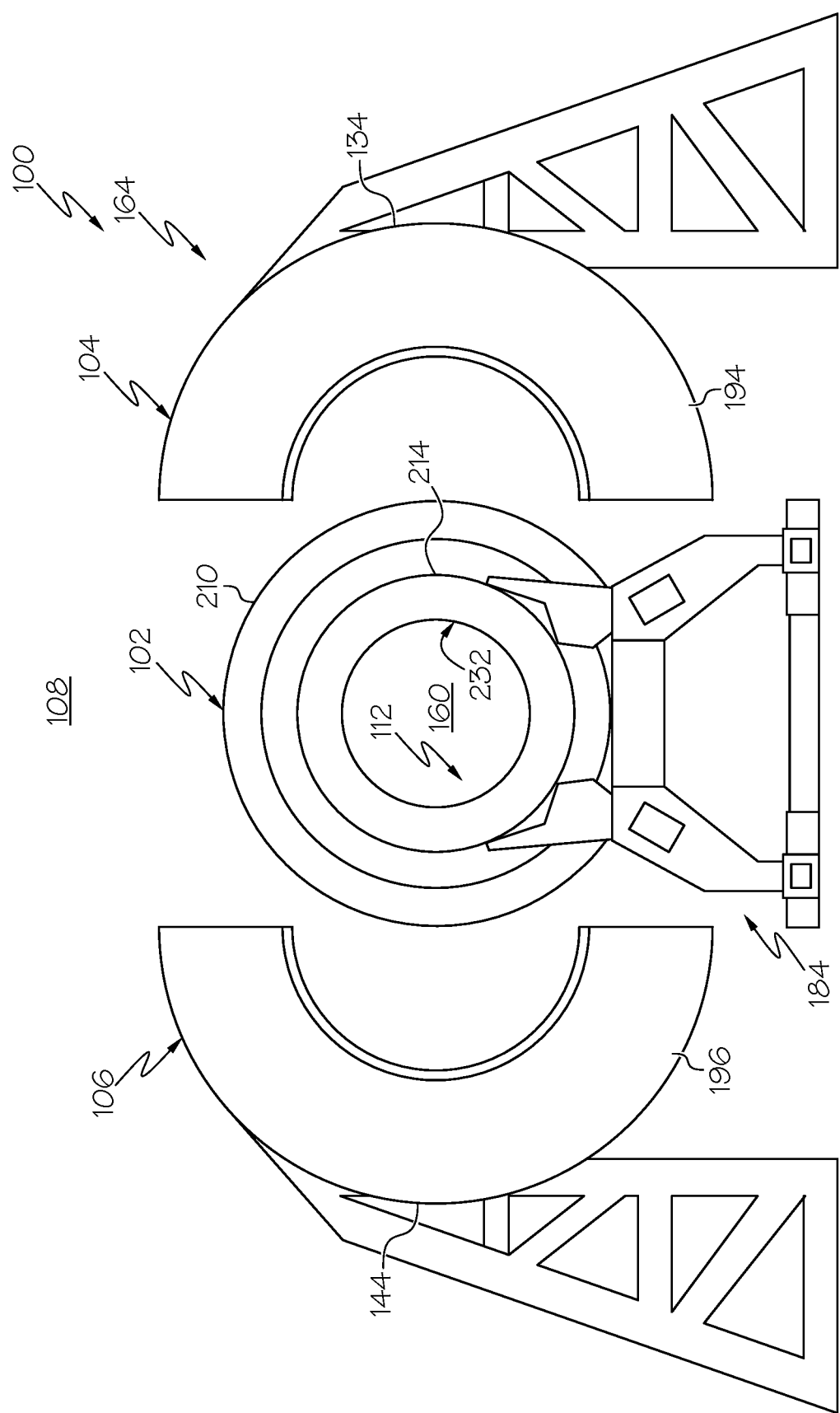
FIG. 3 is a schematic, end view of an example of the apparatus.
Figure 4:
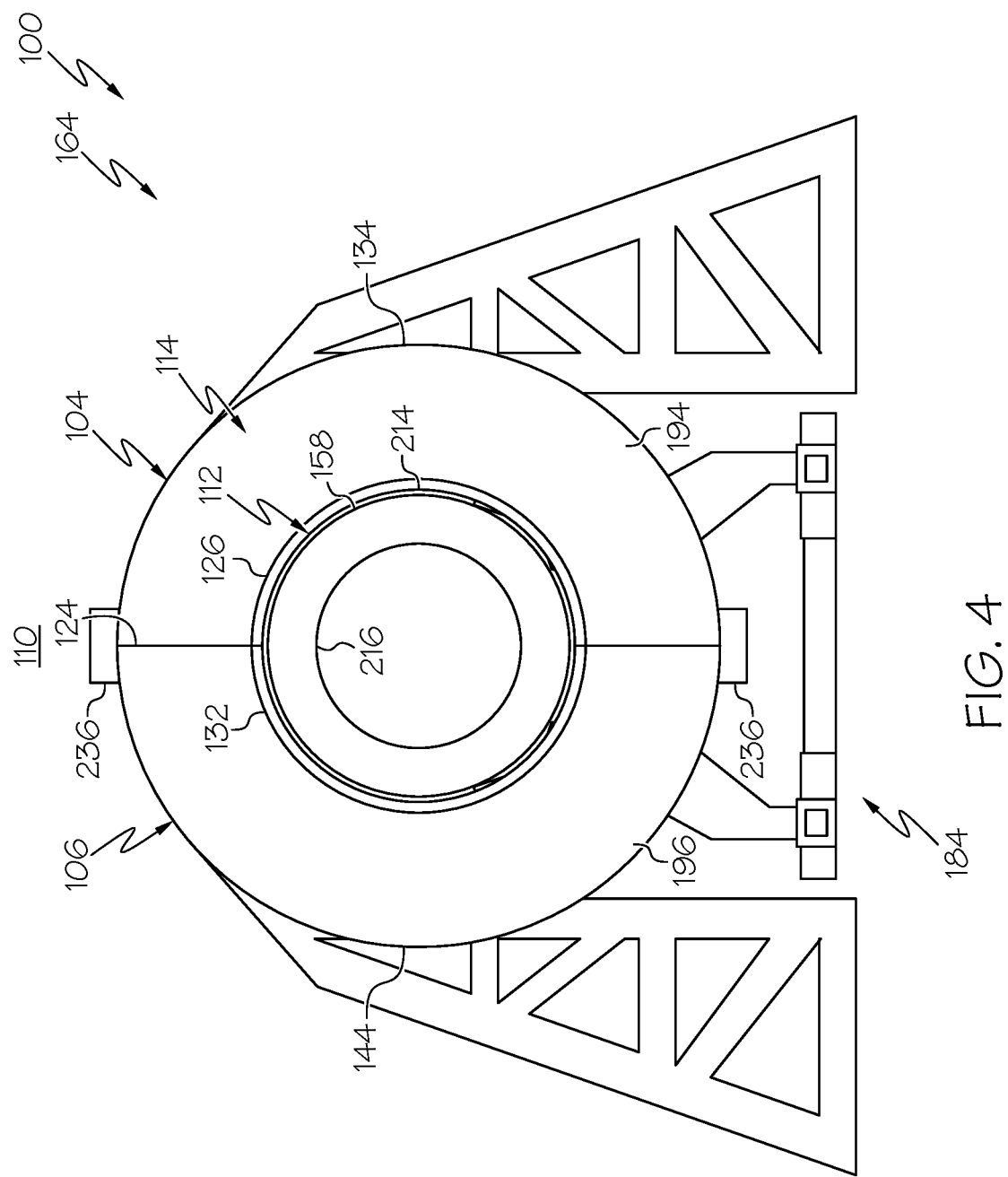
FIG. 4 is a schematic, end view of an example of the apparatus.

As best illustrated in FIGS. 3 and 4, in one or more examples, with the mandrel-tool 112 appropriately located relative to the tooling assembly 164, at least one of the first processing-tool 104 and the second processing-tool 106 linearly move (e.g., approximately horizontally) relative to each other and relative to the mandrel-tool 112 between the open position 108 (FIG. 3) and the closed position 110 (FIG. 4).

In one or more examples, as illustrated in FIG. 1-6, the mandrel-tool 112 and the composite structure 102 have a closed cross-sectional shape (e.g., circular), such as used to form a barrel-shaped composite product. The first processing-tool 104 and the second processing-tool 106 are suitably designed to accommodate the closed cross-sectional shape of the mandrel-tool 112 and the composite structure 102 for processing.

Figure 8:
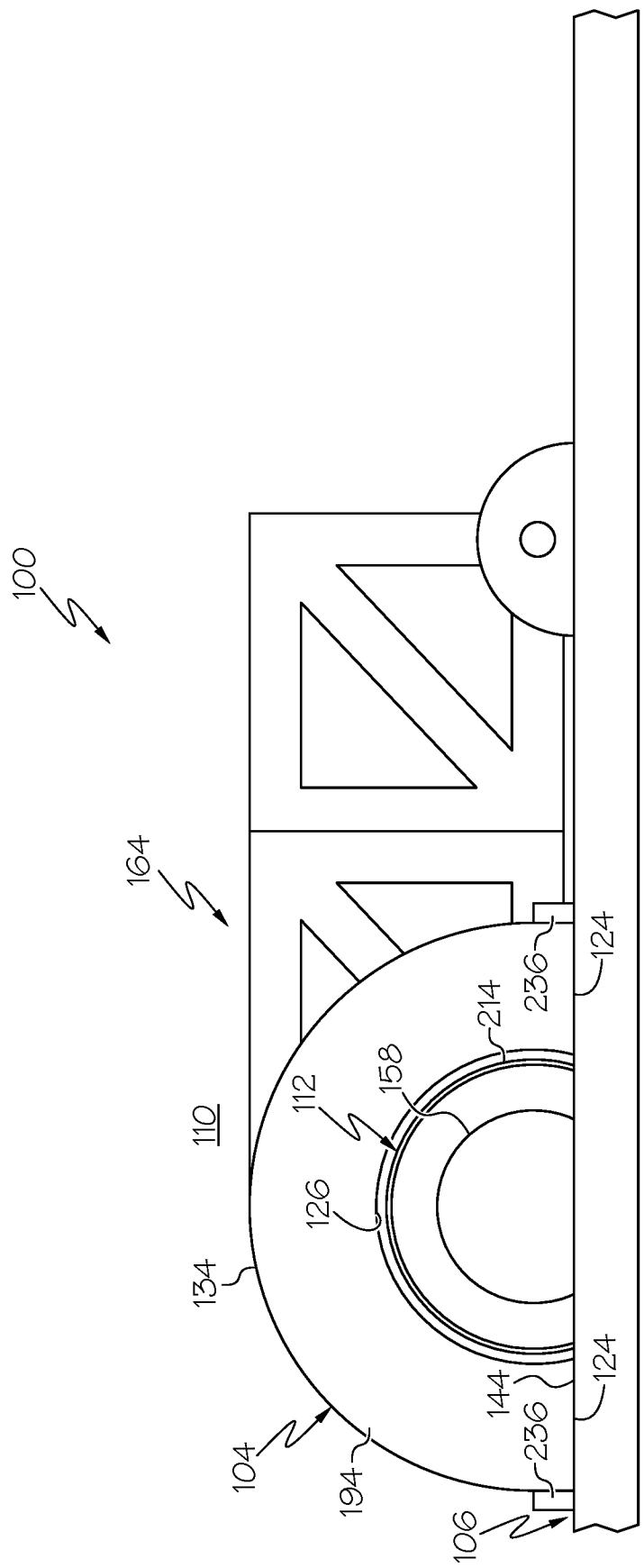
FIG. 8 is a schematic, end view of an example of the apparatus.

As best illustrated in FIGS. 7 and 8, in one or more examples, with the mandrel-tool 112 appropriated located relative to the tooling assembly 164, the first processing-tool 104 pivotally moves relative to the second processing-tool 106 and relative to the mandrel-tool 112 between the open position 108 (FIG. 7) and the closed position 110 (FIG. 8).

In one or more examples (not explicitly illustrated), with the mandrel-tool 112 appropriately located relative to the tooling assembly 164, the first processing-tool 104 moves linearly (e.g., approximately vertically or is lowered) relative to the second processing-tool 106 and relative to the mandrel-tool 112 between the open position and the closed position.

In one or more examples, as illustrated in FIGS. 7-11, the mandrel-tool 112 and the composite structure 102 have an open cross-sectional shape (e.g., semi-circular), such as used to form a half barrel-shaped composite product. The first processing-tool 104 and the second processing-tool 106 are suitably designed to accommodate the open cross-sectional shape of the mandrel-tool 112 and the composite structure 102 for processing.

Generally, the tooling assembly 164 is configured to be complementary to a shape of the mandrel-tool 112 and/or a shape of the composite structure 102, supported by the mandrel-tool 112. The complementary shapes of the tooling assembly 164 and the mandrel-tool 112 facilitate a reduction in the size of the vessel 114 surrounding the composite structure 102. For example, in conventional autoclave and oven processing, an entirety of a mandrel, supporting a composite, and an entirety of a processing cart, supporting the mandrel, are located within a processing vessel of the autoclave or oven. The disclosed apparatus 100 enables a portion of the mandrel-tool 112 (e.g., opposing end portions 214 (FIG. 1) of the mandrel-tool 112) and an entirety of the processing cart 184 to be located outside of the vessel 114, which significantly reduces the size of the vessel 114. As such, and as illustrated in FIGS. 3-11, the configuration and/or shape of the first processing-tool 104 and the second processing-tool 106 may depend on the configuration and/or shape (e.g., closed cross-sectional shape or open cross-sectional shape) of the mandrel-tool 112 and/or the composite structure 102.

Additionally, in the closed position 110, the tooling assembly 164 and the mandrel-tool 112 may have a variety of sealing configurations, depending on the configuration and/or shape (e.g., closed cross-sectional shape or open cross-sectional shape) of the mandrel-tool 112 or on the configuration and/or shape (e.g., closed cross-sectional shape or open cross-sectional shape) of the composite structure 102, supported by the mandrel-tool 112.

FIG. 3 schematically illustrates an example of a first configuration of the tooling assembly 164 in the open position 108 with the mandrel-tool 112, supporting the composite structure 102, located between the first processing-tool 104 and the second processing-tool 106. The example of the apparatus 100 illustrated in FIG. 3 depicts an end view of the first processing-tool 104, the second processing-tool 106, and the mandrel-tool 112, supporting the composite structure 102 and supported by the processing-cart 184.

Figure 5:
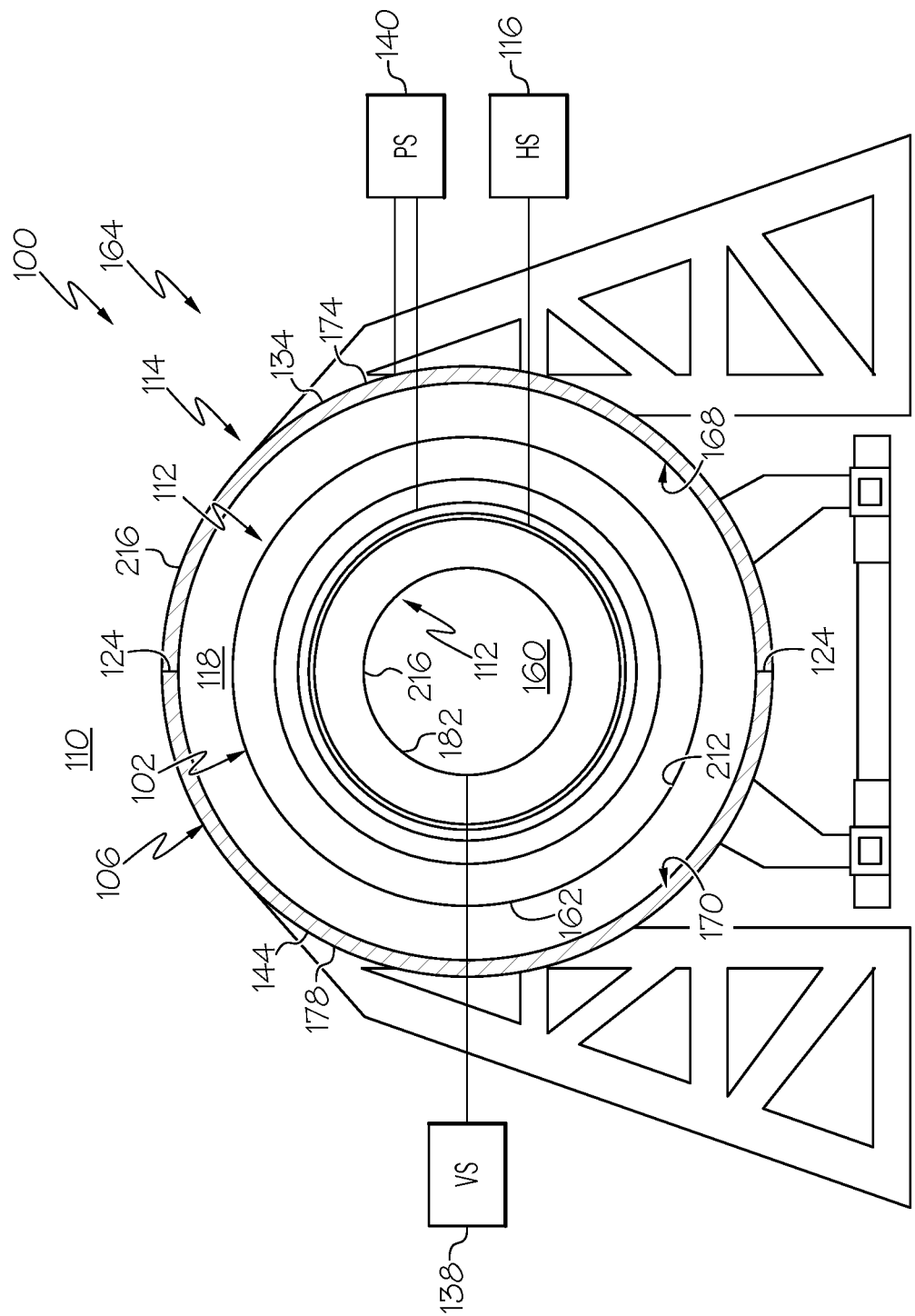
FIG. 5 is a schematic, sectional, end view of an example of the apparatus.
Figure 6:
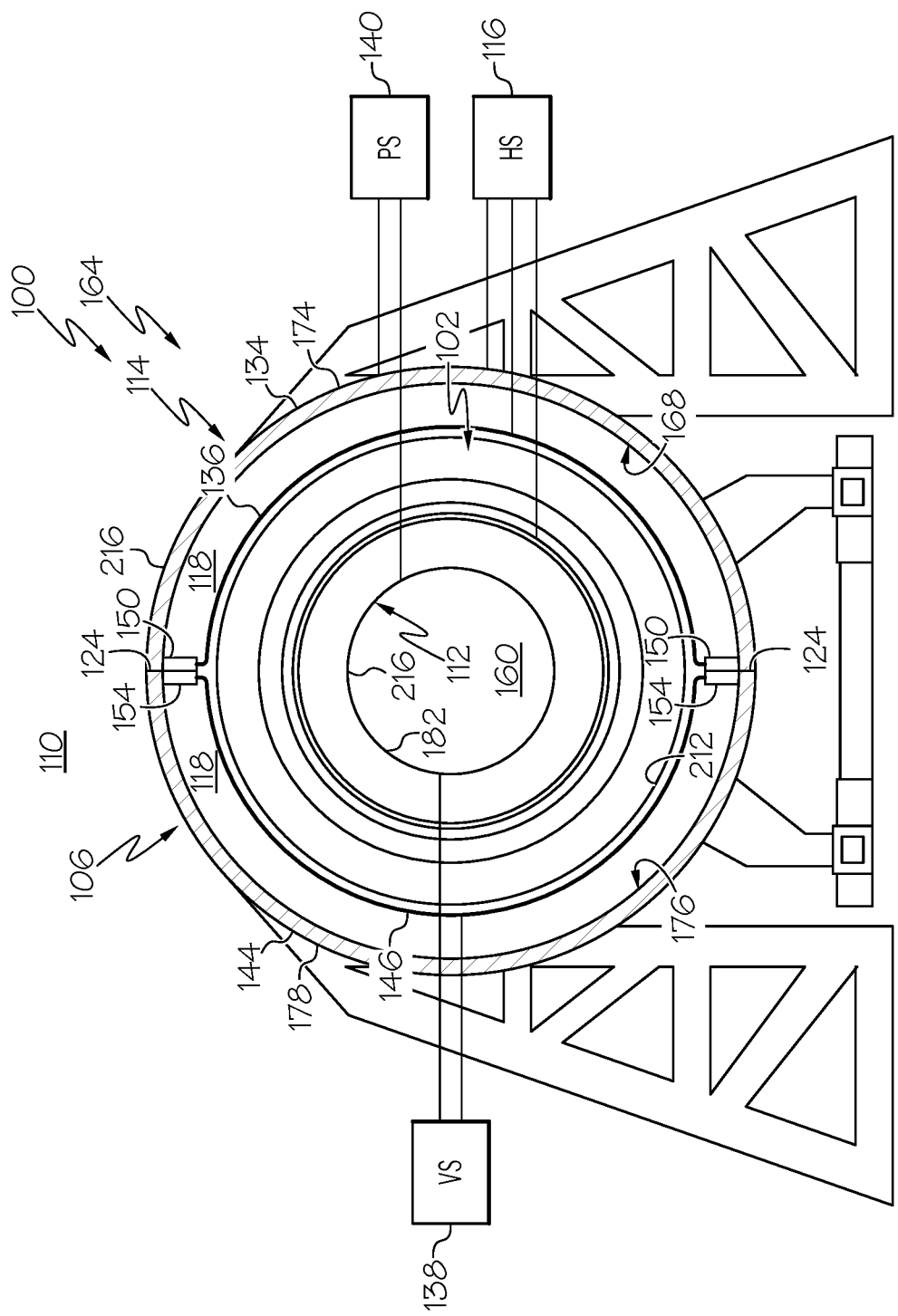
FIG. 6 is a schematic, sectional, end view of an example of the apparatus.

FIGS. 4-6 schematically illustrate examples of the first configuration of the tooling assembly 164 in the closed position 110 with the mandrel-tool 112, supporting the composite structure 102, located between the first processing-tool 104 and the second processing-tool 106 and sealed with the first processing-tool 104 and the second processing-tool 106 to form the vessel 114. The example of the apparatus 100 illustrated in FIG. 4 depicts an end view of the first processing-tool 104, the second processing-tool 106, and the mandrel-tool 112, supporting the composite structure 102 and supported by the processing cart 184. The examples of the apparatus 100 illustrated in FIGS. 5 and 6 depict sectional, end views of the first processing-tool 104, the second processing-tool 106, and the mandrel-tool 112, supporting the composite structure 102 and supported by the processing-cart 184. FIG. 5 depicts an example of the apparatus 100 that utilizes the compression bagging 162 that surrounds the outer surface 212 of the composite structure 102. FIG. 6 depicts an example of the apparatus 100 that utilizes the first conformable membrane 136 and the second conformable membrane 146 that surround the outer surface 212 of the composite structure 102.

FIG. 7 schematically illustrates an example of a second configuration of the tooling assembly 164 in the open position 108 with the mandrel-tool 112, supporting the composite structure 102, located on the second processing-tool 106. The example illustrated in FIG. 7 depicts an end view of the first processing-tool 104, the second processing-tool 106, and the mandrel-tool 112, supporting the composite structure 102 and supported by the second processing-tool 106.

Figure 9:
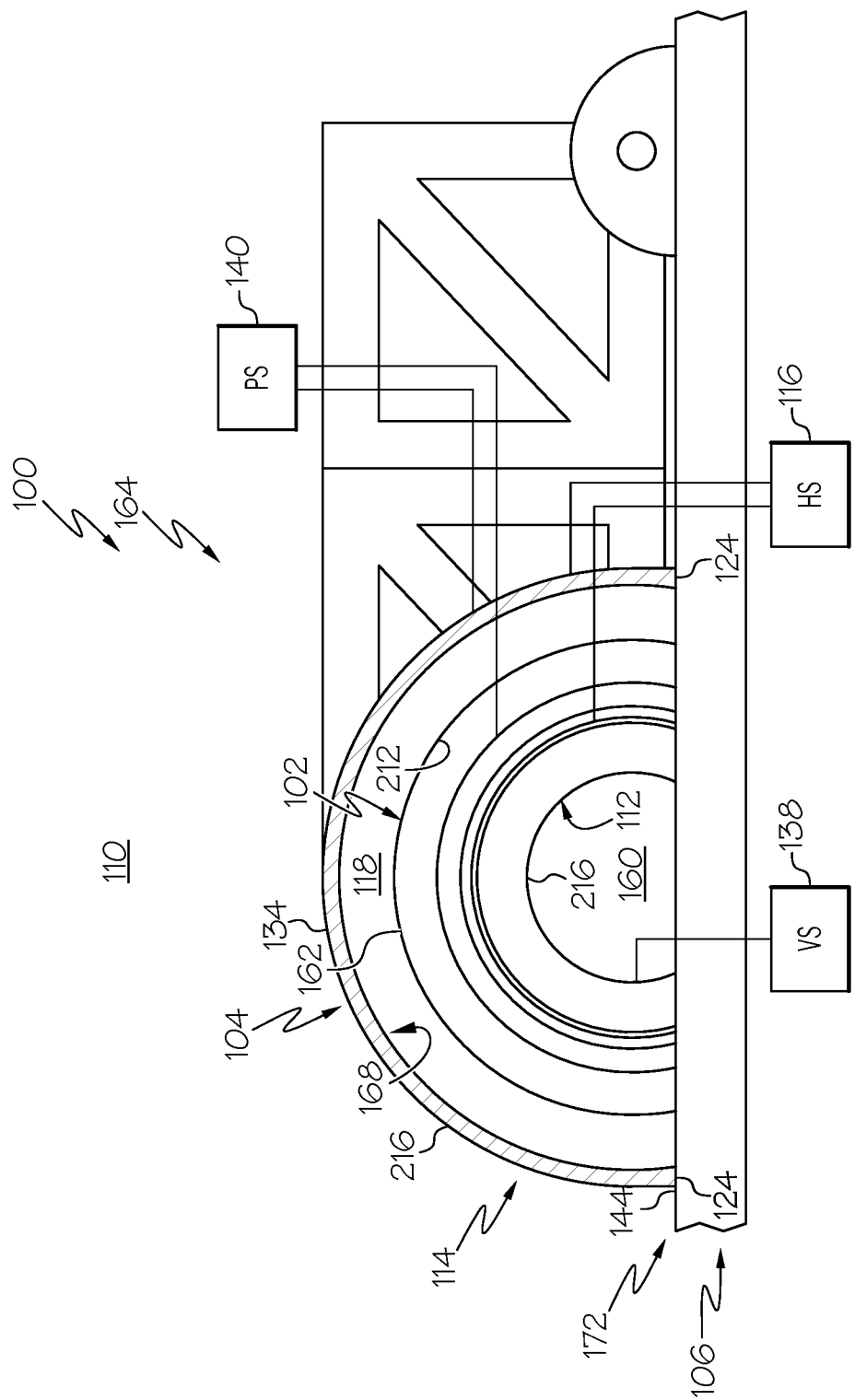
FIG. 9 is a schematic, sectional, end view of an example of the apparatus.
Figure 10:
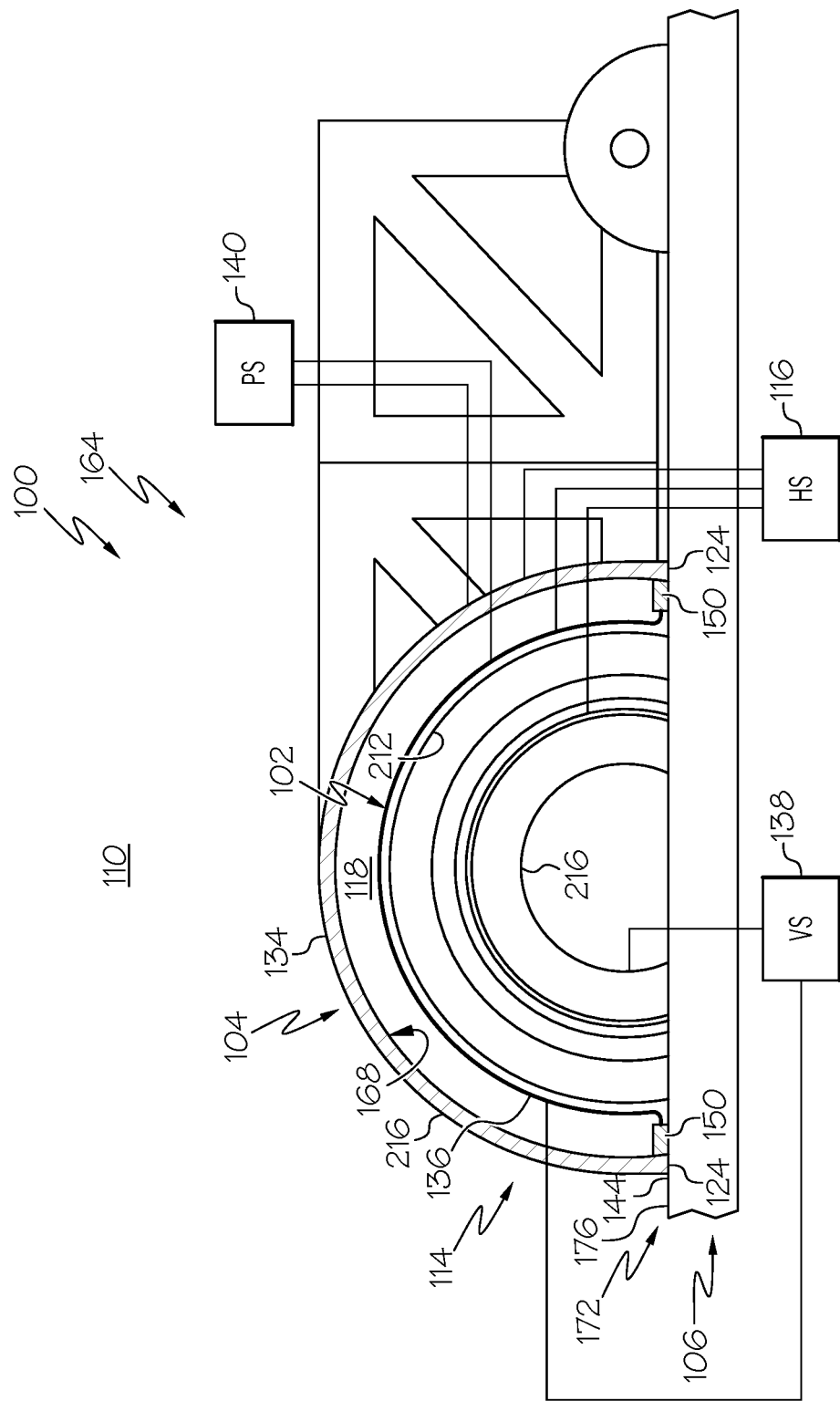
FIG. 10 is a schematic, sectional, end view of an example of the apparatus.

FIGS. 8-10 schematically illustrate examples of the second configuration of the tooling assembly 164 in the closed position 110 with the mandrel-tool 112, supporting the composite structure 102, located between the first processing-tool 104 and the second processing-tool 106 and sealed with the first processing-tool 104 and the second processing-tool 106 to form the vessel 114. The example of the apparatus 100 illustrated in FIG. 8 depicts an end view of the first processing-tool 104, the second processing-tool 106, and the mandrel-tool 112, supporting the composite structure 102 and supported by the second processing-tool 106. The examples of the apparatus 100 illustrated in FIGS. 9 and 10 depict sectional, end views of the first processing-tool 104, the second processing-tool 106, and the mandrel-tool 112, supporting the composite structure 102 and supported by the second processing-tool 106. FIG. 9 depicts an example of the apparatus 100 that utilizes the compression bagging 162 that surrounds the outer surface 212 of the composite structure 102. FIG. 10 depicts an example of the apparatus 100 that utilizes the first conformable membrane 136 that surrounds the outer surface 212 of the composite structure 102.

Figure 11:
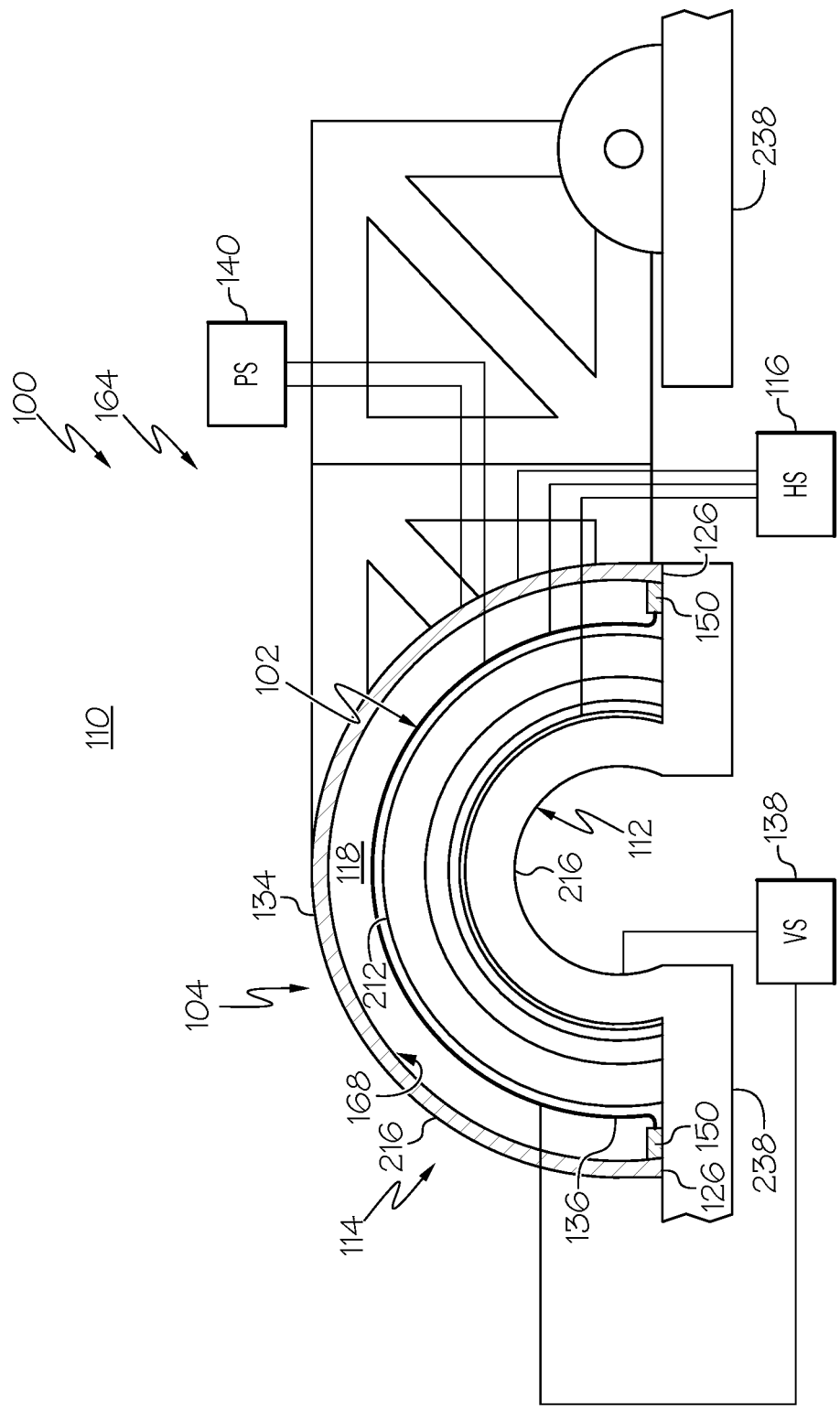
FIG. 11 is a schematic, sectional, end view of an example of the apparatus.

FIG. 11 schematically illustrates an example of a third configuration of the tooling assembly 164 in the closed position with the mandrel-tool 112, supporting the composite structure 102, sealed with the first processing-tool 104 to form the vessel 114. The example illustrated in FIG. 11 depicts a sectional, end view of the first processing-tool 104 and the mandrel-tool 112, supporting the composite structure 102. FIG. 11 depicts an example of the apparatus 100 that utilizes the first conformable membrane 136 that surrounds the outer surface 212 of the composite structure 102. However, the configuration illustrated in FIG. 11 may alternatively, or additionally, utilize the compression bagging 162 that surrounds the composite structure 102.

As will be apparent from the present disclosure, the apparatus 100 is not limited to the configurations illustrated in FIGS. 3-11, and other configurations are also contemplated.

As illustrated in FIGS. 4-6, in one or more examples, the mandrel-tool 112 is located between the first processing-tool 104 and the second processing-tool 106. In the closed position 110, the first processing-tool 104 and the second processing-tool 106 are configured to be hermetically sealed to each other along the first interface 124 via a portion of the interface-seal 180 (FIG. 1). In the closed position 110, the first processing-tool 104 is configured to be hermetically sealed to the outer surface 210 of the end portions 214 of the mandrel-tool 112 along the second interface 126 via another portion of the interface-seal 180 (FIG. 1). In the closed position 110, the second processing-tool 106 is configured to be hermetically sealed to the outer surface 210 of the end portions 214 of the mandrel-tool 112 along the third interface 132 via another portion of the interface-seal 180 (FIG. 1).

Referring to FIGS. 5 and 6, in the closed position 110, the first processing-tool 104 and the second processing-tool 106 form a portion (e.g., outer portion) of a wall 216 that forms an outer shell or outer shroud of the vessel 114, for example, having a circular cross-sectional shape. In the closed position 110, the mandrel-tool 112 forms another portion (e.g., inner portion) of the wall 216 that forms an inner shell of the vessel 114, for example, having a circular cross-sectional shape. This configuration is advantageous for processing composite structures having a closed (e.g., circular) cross-sectional shape, for example, as illustrated in FIGS. 1-6.

As illustrated in FIGS. 8-10, in one or more examples, the mandrel-tool 112 is positioned on or is supported by the second processing-tool 106. In the closed position 110, the first processing-tool 104 and the second processing-tool 106 are configured to be hermetically sealed to each other along the first interface 124 via a portion of the interface-seal 180. In the closed position 110, the first processing-tool 104 is also configured to be hermetically sealed to the outer surface 210 of the end portions 214 of the mandrel-tool 112 along the second interface 126 via another portion of the interface-seal 180.

Referring to FIGS. 9 and 10, in the closed position 110, the first processing-tool 104, the second processing-tool 106 form a portion (e.g., the outer portion) of the wall 216 of the vessel 114, for example, having a semi-circular cross-sectional shape. In the closed position 110, the mandrel-tool 112 forms another portion (e.g., the inner portion) of the wall 216 of the vessel 114, for example, having a semi-circular cross-sectional shape. In the examples illustrated in FIGS. 7-10, the second processing-tool 106 may be, but is not required to be, hermetically sealed with the mandrel-tool 112. This configuration is advantageous for processing composite structures having an open cross-sectional shape (e.g., semi-circular), for example, as illustrated in FIGS. 7-10, a planar cross-sectional shape, or other complex cross-sectional shapes.

As illustrated in FIG. 11, in one or more examples, the mandrel-tool 112 also serves as a processing-tool. In the closed position 110, the first processing-tool 104 is configured to be hermetically sealed to the mandrel-tool 112 along the second interface 126 via a portion of the interface-seal 180. In these examples, the vessel 114 is formed by the first process-tool 104 and the mandrel-tool 112 without requiring use of the second processing-tool 106. In other words, the mandrel-tool 112 serves as a processing-tool. In the closed position 110, the first processing-tool 104 forms a portion of the wall 216 of the vessel 114 and the mandrel-tool 112 forms another portion of the wall 216 of the vessel 114.

In the closed position 110, the first processing-tool 104 is configured to be hermetically sealed to the mandrel-tool 112 along the second interface 126 via the interface-seal 180. In one or more examples, the mandrel-tool 112 includes an opposing pair of mandrel-flanges 238 that extend outwardly along a length of the mandrel-tool 112. In the closed position 110, the first processing-tool 104 is configured to be hermetically sealed to the mandrel-flanges 238 along the second interface 126 via a portion of the interface-seal 180 (FIG. 1) and ends of the first processing-tool 104 are configured to be hermetically sealed to the outer surface 210 of the end portions 214 of the mandrel-tool 112 along the second interface 126 via another portion of the interface-seal 180. Thus, the vessel 114 is sealed via the interface-seal 180 that is in direct contact with the outer surface 210 of opposing end portions 214 of the mandrel-tool 112, the mandrel-flanges 238, and the first processing-tool 104 when the tooling assembly 164 is in the closed position 110. In other words, the mandrel-tool 112 and the first processing-tool 104 form the perimeter of the vessel 114 along the interface-seal 180.

Referring to FIGS. 1 and 3-11, in one or more examples, the first processing-tool 104 includes a first vessel-wall 134 that forms a portion of the wall 216 of the vessel 114. In one or more examples, the first processing-tool 104 also includes an opposed pair of first vessel-ends 194 that form a portion of the wall 216 the vessel 114 (only one of the first vessel-ends 194 is visible in FIGS. 3, 4, 7 and 8). In an example, each one of the first vessel-ends 194 extends from and is approximately perpendicular to the first vessel-wall 134. In these examples, the first vessel-wall 134 and the first vessel-ends 194 form a first portion of the wall 216 of the vessel 114.

Referring to FIGS. 1 and 3-6, in one or more examples, the second processing-tool 106 includes a second vessel-wall 144 that forms a portion of the wall 216 of the vessel 114. In one or more examples, the second processing-tool 106 also includes an opposed pair of second vessel-ends 196 that form a portion of the wall 216 of the vessel 114 (only one of the second vessel-ends 196 is visible in FIGS. 3 and 4). In an example, each one of the second vessel-ends 196 extends from and is approximately perpendicular to the second vessel-wall 144. In these examples, the second vessel-wall 144 and the second vessel-ends 196 form a second portion of the wall 216 of the vessel 114.

As illustrated in FIGS. 5 and 6, in one or more examples, in the closed position 110, the first vessel-wall 134 and the second vessel-wall 144 are sealed at the first interface 124 via a portion of the interface-seal 180 (FIG. 1). As illustrated in FIG. 4, in the closed position 110, a portion of each one of the first vessel-ends 194 and a portion of each one of the second vessel-ends 196 are sealed at the first interface 124 via another portion of the interface-seal 180. As illustrated in FIG. 4, in the closed position 110, another portion of each one of the first vessel-ends 194 (only one of the first vessel-ends 194 is visible in FIG. 4) and the outer surface 210 of the end portions 214 of the mandrel-tool 112 are sealed together at the second interface 126 via another portion of the interface-seal 180. As illustrated in FIG. 4, in the closed position 110, another portion of each one of the second vessel-ends 196 (only one of the second vessel-ends 196 is visible in FIG. 4) and the outer surface 210 of the end portions 214 of the mandrel-tool 112 are sealed together at the third interface 132 via another portion of the interface-seal 180.

Accordingly, in one or more examples, with the tooling assembly 164 in the closed position 110, the vessel 114 is formed by the first vessel-wall 134, the first vessel-ends 194, the second vessel-wall 144, the second vessel-ends 196, and the mandrel-tool 112. The vessel 114 is sealed via the interface-seal 180 (FIG. 1) that is in direct contact with the first vessel-wall 134, the first vessel-ends 194, the second vessel-wall 144, the second vessel-ends 196, and the outer surface 210 of the end portions 214 of the mandrel-tool 112 along the first interface 124, the second interface 126, and the third interface 132.

Referring to FIGS. 7-10, in one or more examples, the second processing-tool 106 includes the second vessel-wall 144 that forms a portion of the wall 216 of the vessel 114. In these examples, the second vessel-wall 144 forms a second portion of the wall 216 of the vessel 114.

As illustrated in FIGS. 9 and 10, in one or more examples, in the closed position 110, the first vessel-wall 134 and the second vessel-wall 144 are sealed at the first interface 124 via a portion of the interface-seal 180. As illustrated in FIG. 8, in the closed position 110, a portion of each one of the first vessel-ends 194 (only one of the first vessel-ends 194 is visible in FIG. 8) and the second vessel-wall 144 are sealed at the first interface 124 via another portion of the interface-seal 180. As illustrated in FIG. 8, in the closed position 110, another portion of each one of the first vessel-ends 194 and the outer surface 210 of the end portions 214 of the mandrel-tool 112 are sealed together at the second interface 126 via another portion of the interface-seal 180.

Accordingly, in one or more examples, with the tooling assembly 164 in the closed position 110, the vessel 114 is formed by the first vessel-wall 134, the first vessel-ends 194, the second vessel-wall 144, and the mandrel-tool 112. The vessel 114 is sealed via the interface-seal 180 that is in direct contact with the first vessel-wall 134, the first vessel-ends 194, the second vessel-wall 144, and the outer surface 210 of the end portions 214 of the mandrel-tool 112 along the first interface 124 and the second interface 126.

As illustrated in FIG. 11, in one or more examples, in the closed position 110, the first vessel-wall 134 and the first vessel-ends 194 (not visible in FIG. 11) are sealed to the mandrel-tool 112 at the second interface 126 via a portion of the interface-seal 180 to form the vessel 114. In one or more examples, in the closed position 110, the first vessel-wall 134 and a portion of each one of the first vessel-ends 194 (not visible in FIG. 11) and the mandrel-flanges 238 are sealed at the second interface 126 via a portion of the interface-seal 180. In the closed position 110, another portion of each one of the first vessel-ends 194 and the outer surface 210 of end portions 214 of the mandrel-tool 112 are sealed together at the second interface 126 via another portion of the interface-seal 180.

Accordingly, in one or more examples, with the tooling assembly 164 in the closed position 110, the vessel 114 is formed by the first vessel-wall 134 and the mandrel-tool 112. The vessel 114 is sealed via the interface-seal 180 that is in direct contact with the first vessel-wall 134, the first vessel-ends 194, the mandrel-flanges 238, and the outer surface 210 of the mandrel-tool 112 along the second interface 126.

Figure 12:
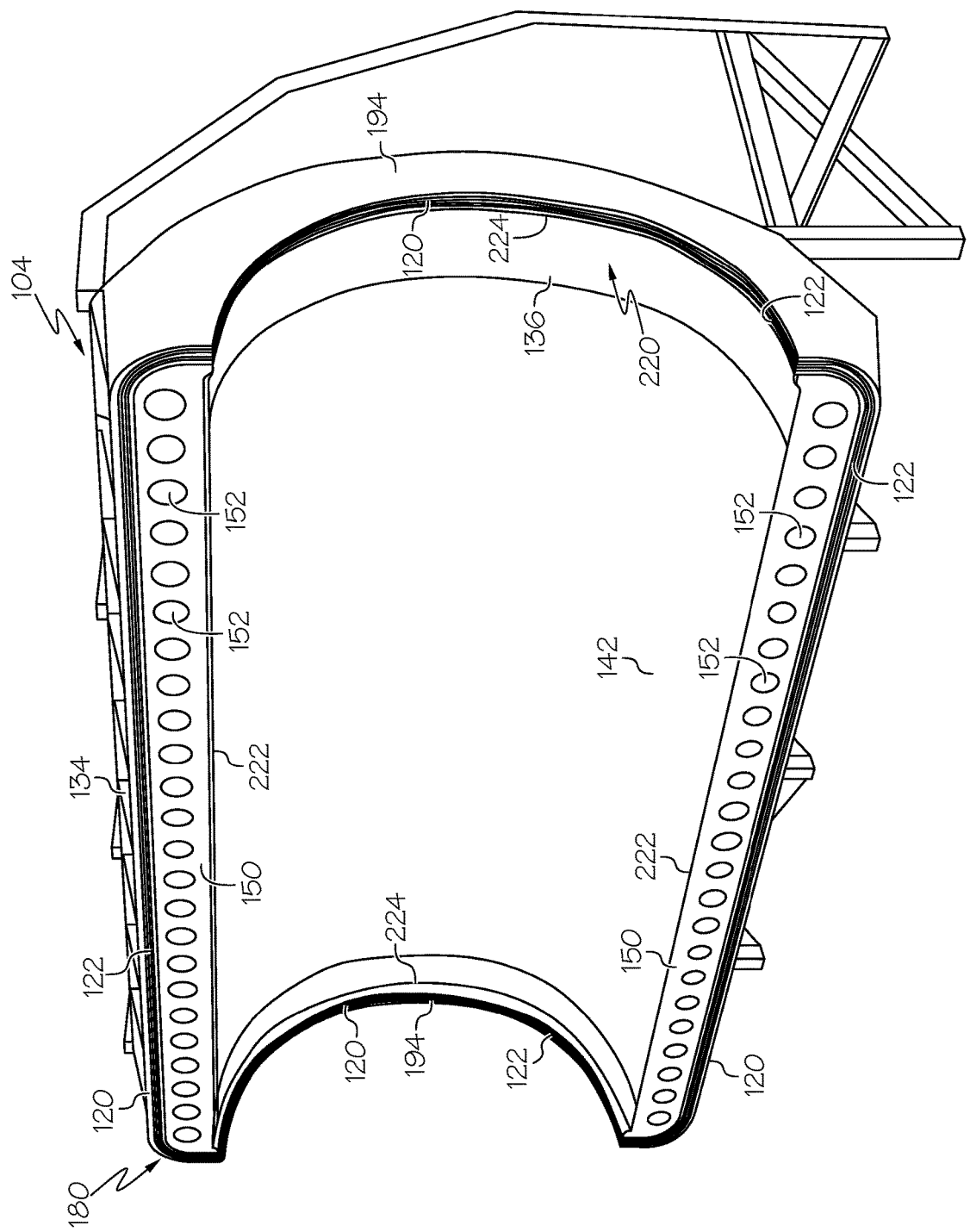
FIG. 12 is a schematic, perspective view of an example of a first processing-tool of the apparatus.
Figure 13:
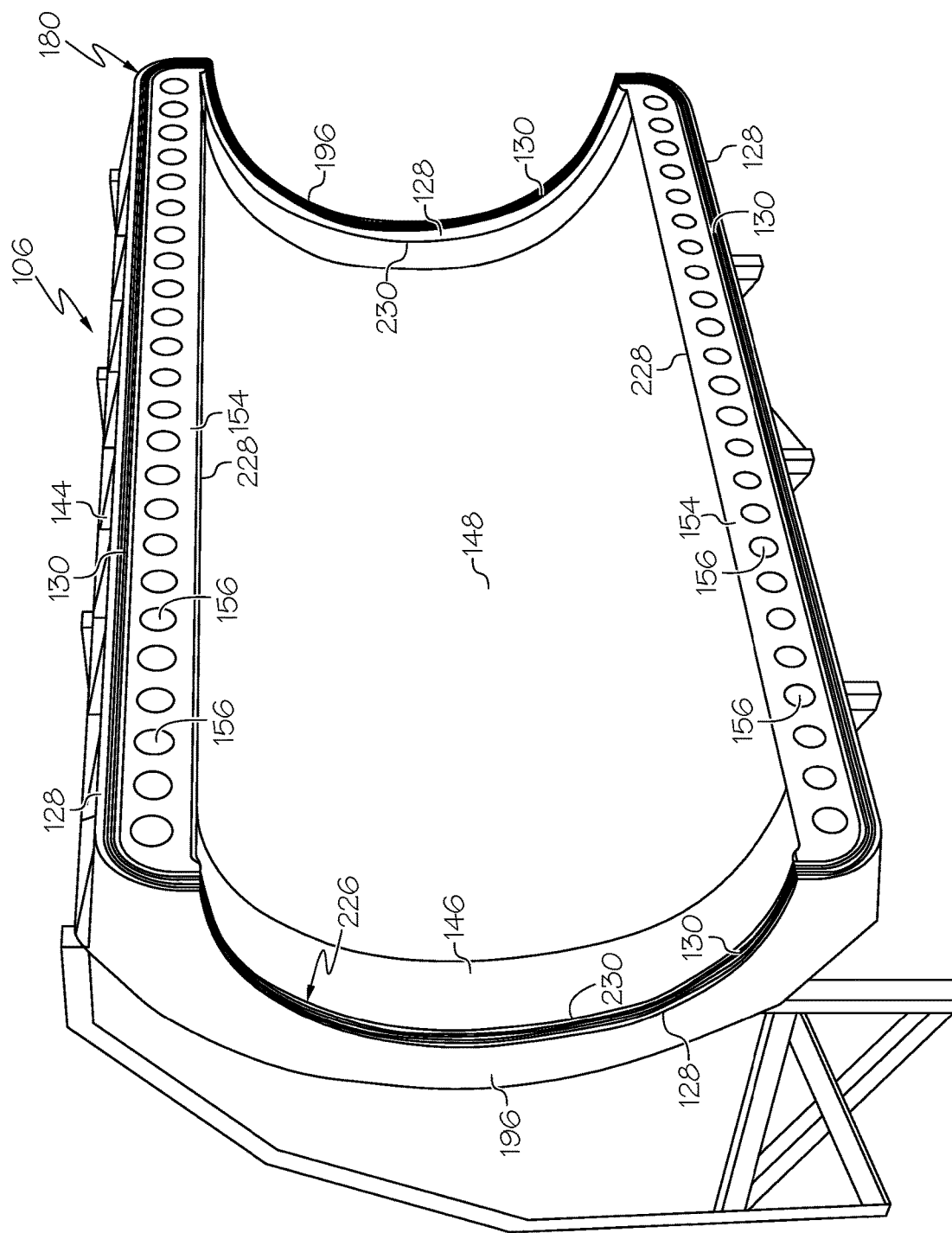
FIG. 13 is a schematic, perspective view of an example of a second processing-tool of the apparatus.

FIGS. 12 and 13 schematically illustrate an example of the interface-seal 180. With the tooling assembly 164 in the closed position 110, the interface-seal 180 is configured to seal the tooling assembly 164 and the mandrel-tool 112 together to form the vessel 114, surrounding the composite structure 102. FIG. 12 illustrates a first portion of the interface-seal 180 associated with the first processing-tool 104 and the FIG. 13 illustrates a second portion of the interface-seal 180 associated with the second processing-tool 106.

Referring to FIGS. 12, 14 and 15, in one or more examples, the first processing-tool 104 includes a first interface-seal 122. The first interface-seal 122 is an example of, or forms a portion of, the interface-seal 180. In the closed position 110, the first interface-seal 122 is configured to seal the first interface 124 between the first processing-tool 104 and the second processing-tool 106. In the closed position 110, the first interface-seal 122 is also configured to seal the second interface 126 between the first processing-tool 104 and the mandrel-tool 112. For example, the first interface-seal 122 extends along a perimeter of the first vessel-wall 134 and the first vessel-ends 194. The first interface-seal 122 forms at least a portion of the seal between the first vessel-wall 134 and the second vessel-wall 144. The first interface-seal 122 forms at least a portion of the seal between the first vessel-ends 194 and the second vessel-ends 196. The first interface-seal 122 forms the seal between the first vessel-ends 194 and the outer surface 210 of the end portions 214 of the mandrel-tool 112.

In one or more examples, the first processing-tool 104 includes a first interface-surface 120. In one or more examples, the first interface-surface 120 forms the perimeter of the first vessel-wall 134. In one or more examples, the first interface-surface 120 also forms the perimeter of each one of the first vessel-ends 194. In one or more examples, the first interface-seal 122 extends along an entirety of the first interface-surface 120. Generally, the first interface-seal 122 is a re-usable seal.

Figure 17:
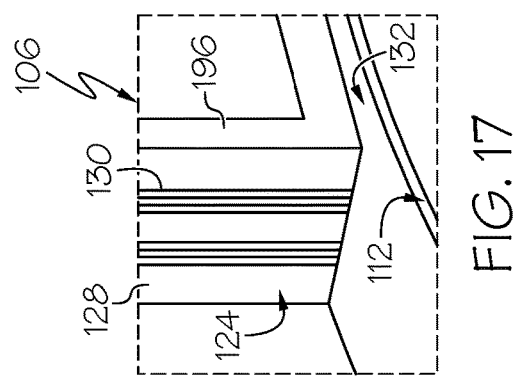
FIG. 17 is a schematic, perspective view of an example of a sealing interface of the second processing-tool of FIG. 16.
Figure 16:
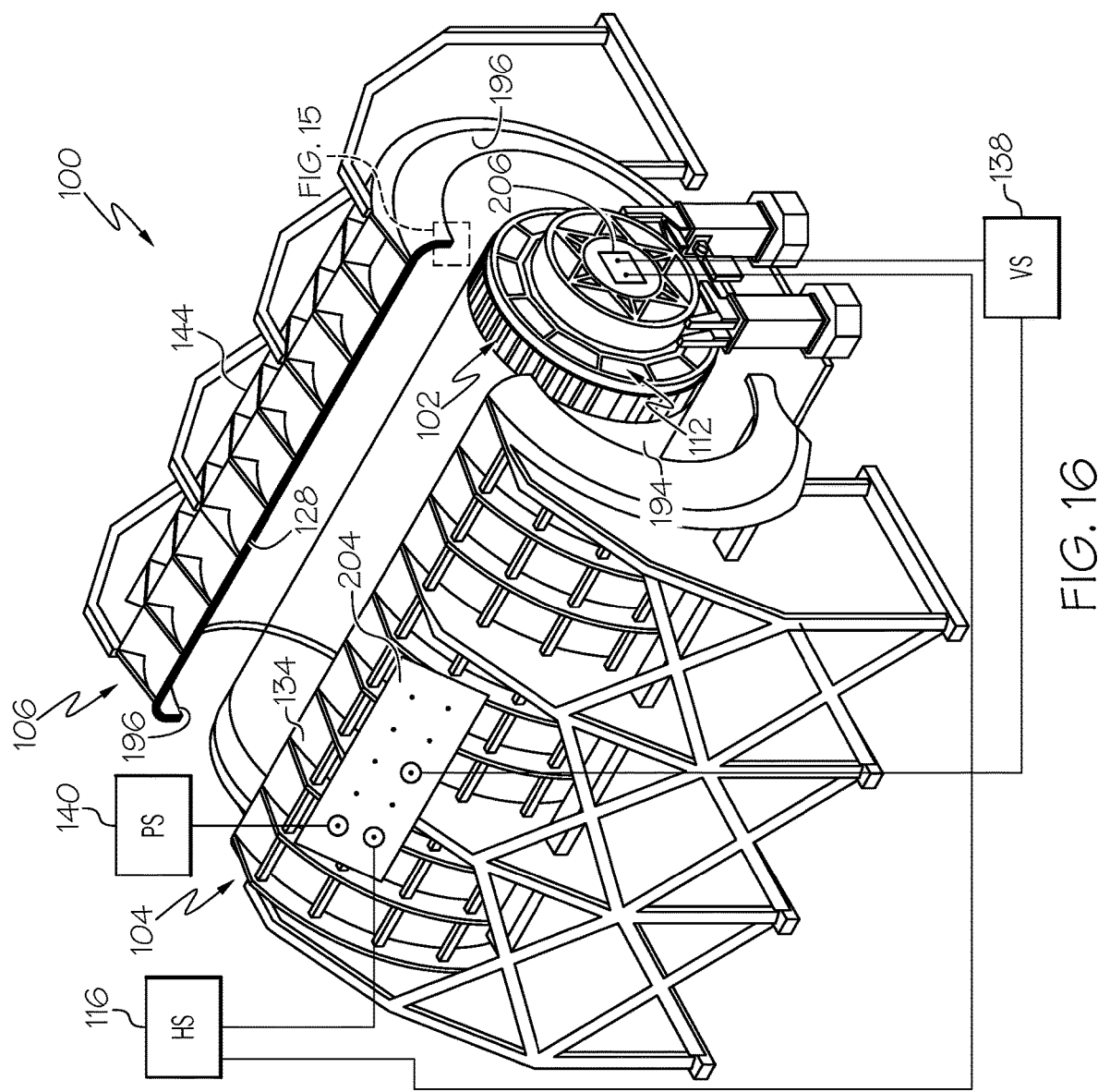
FIG. 16 is a schematic, perspective view of an example of the first processing-tool and the second processing-tool.

Referring to FIGS. 13, 16 and 17, in one or more examples, the second processing-tool 106 includes a second interface-seal 130. The second interface-seal 130 is an example of, or forms a portion of, the interface-seal 180. In the closed position 110, the second interface-seal 130 is configured to seal the first interface 124 between the first processing-tool 104 and the second processing-tool 106. In the closed position 110, the second interface-seal 130 is configured to seal the third interface 132 between the second processing-tool 106 and the mandrel-tool 112. For example, the second interface-seal 130 extends along a perimeter of the second vessel-wall 144 and the second vessel-ends 196. The second interface-seal 130 forms at least a portion of the seal between the first vessel-wall 134 and the second vessel-wall 144. The second interface-seal 130 forms at least a portion of the seal between the first vessel-ends 194 and the second vessel-ends 196. The second interface-seal 130 forms the seal between the second vessel-ends 196 and the outer surface 210 of the end portions 214 of the mandrel-tool 112.

In one or more examples, the second processing-tool 106 includes a second interface-surface 128. In one or more examples, the second interface-surface 128 forms the perimeter of the second vessel-wall 144. In one or more examples, the second interface-surface 128 also forms the perimeter of each one of the second vessel-ends 196. In one or more examples, the second interface-seal 130 extends along an entirety of the second interface-surface 128. Generally, the second interface-seal 130 is a re-usable seal.

As illustrated in FIGS. 15 and 17, in one or more examples, the first interface-seal 122 and the second interface-seal 130 have complementary geometries. The complementary geometries of the first interface-seal 122 and the second interface-seal 130 are configured to enable mating contact with each other in the closed position 110 to form a hermetic seal. The complementary geometries are particularly beneficial at the three-way intersection of the first interface 124, between the first processing-tool 104 and the second processing-tool 106, the second interface 126 between the first processing-tool 104 and the mandrel-tool 112, and the third interface 132, between the second processing-tool 106 and the mandrel-tool 112.

Referring to FIGS. 2, 4 and 8, in one or more examples, the tooling assembly 164 is temporarily secured in the closed position 110, in which the tooling assembly 164 and the mandrel-tool 112 are sealed together to form the vessel 114, during processing of the composite structure 102. In one or more examples, the tooling assembly 164 includes at least one fastening device 236. As illustrated in FIG. 2, the at least fastening device 236 includes, or takes the form of, any suitable mechanism used to hold and secure the first processing-tool 104 and the second processing-tool 106 tightly together to prevent movement or separation, such as a clamp. As illustrated in FIG. 4, the at least fastening device 236 includes, or takes the form of, any suitable mechanism used to hold and secure the first processing-tool 104 and the mandrel-tool 112 tightly together to prevent movement or separation, such as a clamp.

Referring to FIGS. 6, 10 and 12, in one or more examples, the apparatus 100, such as the first processing-tool 104, includes a first conformable membrane 136. In the closed position 110, the first conformable membrane 136 is configured to be pressed against the composite structure 102, as illustrated in FIGS. 6 and 10. Generally, the first conformable membrane 136 is a re-usable component of the apparatus 100. In one or more examples, the first conformable membrane 136 compresses the composite structure 102 between the first conformable membrane 136 and the outer surface 210 of the mandrel-tool 112. In one or more examples, the first conformable membrane 136 serves as an alternative to consumable vacuum bagging or compression bagging.

In one or more examples, in the closed position 110, the composite structure 102 is located between the mandrel-tool 112 and the first conformable membrane 136. During processing, the first conformable membrane 136 applies pressure to the outer surface 212 of the composite structure 102 and compresses the composite structure 102 against the outer surface 210 of the mandrel-tool 112. As will be further described herein, in one or more examples, the first conformable membrane 136 is pressed against the outer surface 212 of the composite structure 102 via at least one of positive pressure applied by the pressure system 140 and/or negative pressure applied by the vacuum system 138.

As best illustrated in FIG. 12, in one or more examples, a first perimeter 220 of the first conformable membrane 136 is coupled to and is sealed to the first processing-tool 104. In one or more examples, a portion of the first conformable membrane 136, such as two opposing first perimeter-first sides 222 of the first perimeter 220 of the first conformable membrane 136, is coupled to and is sealed to the first vessel-wall 134 of the first processing-tool 104. In one or more examples, another portion of the first conformable membrane 136, such as two opposing first perimeter-second sides 224 of the first perimeter 220 of the first conformable membrane 136, is also coupled to and is sealed to the first vessel-ends 194 of the first processing-tool 104.

The first conformable membrane 136 is coupled to the first processing-tool 104 by any suitable method or technique. In one or more examples, the first conformable membrane 136 is coupled and sealed (e.g., hermetically sealed) to the first processing-tool 104, for example, along the first perimeter 220, by mechanical fasteners, chemical bonding (e.g., adhesive or other bonding agent), or a combination of mechanical fasteners and chemical bonding.

Referring to FIGS. 6 and 13, in one or more examples, the apparatus 100, such as the second processing-tool 106, includes a second conformable membrane 146. In the closed position 110, the second conformable membrane 146 is configured to be pressed against the composite structure 102, as illustrated in FIG. 6. Generally, the second conformable membrane 146 is a re-usable component of the apparatus 100. In one or more examples, the second conformable membrane 146 compresses the composite structure 102 between the second conformable membrane 146 and the outer surface 210 of the mandrel-tool 112. In one or more examples, the second conformable membrane 146 serves as an alternative to consumable vacuum bagging or compression bagging.

In one or more examples, in the closed position 110, the composite structure 102 is located between the mandrel-tool 112 and the second conformable membrane 146. During processing, the second conformable membrane 146 applies pressure to the outer surface 212 of the composite structure 102 and compresses the composite structure 102 against the outer surface 210 of the mandrel-tool 112. As will be further described herein, in one or more examples, the second conformable membrane 146 is pressed against the outer surface 212 of the composite structure 102 via at least one of positive pressure applied by the pressure system 140 and/or negative pressure applied by the vacuum system 138.

As illustrated in FIG. 13, in one or more examples, a second perimeter 226 of the second conformable membrane 146 is coupled to and is sealed to the second processing-tool 106. In one or more examples, a portion of the second conformable membrane 146, such as two opposing second perimeter-first sides 228 of the second perimeter 226 of the second conformable membrane 146, is coupled to and is sealed to the second vessel-wall 144 of the second processing-tool 106. In one or more examples, another portion of the second conformable membrane 146, such as two opposing second perimeter-second sides 230 of the second perimeter 226 of the second conformable membrane 146, is also coupled to and is sealed to the second vessel-ends 196 of the second processing-tool 106.

The second conformable membrane 146 is coupled to the second processing-tool 106 by any suitable method or technique. In one or more examples, the second conformable membrane 146 is coupled and sealed (e.g., hermetically sealed) to the second processing-tool 106, for example, along the second perimeter 226, by mechanical fasteners, chemical bonding (e.g., adhesive), or a combination of mechanical fasteners and chemical bonding.

In one or more examples, the first conformable membrane 136 and the second conformable membrane 146 include, or are formed by, a broad, flat, flexible piece (e.g., a sheet) of elastomeric material. The elastomeric material of the first conformable membrane 136 and the second conformable membrane 146 is impermeable and, thus, is capable of being used to apply mechanical pressure to the composite structure 102 during processing via application of positive pressure and/or negative pressure.

In one or more examples, the first conformable membrane 136 and the second conformable membrane 146 are constructed from an elastomer or a combination of elastomers, such as, but not limited to, natural rubber, synthetic rubber, fluoropolymer elastomer (e.g., Viton®), silicone, ethylene propylene diene monomer (EPDM) rubber, and the like. In one or more examples, the elastomer or combination of elastomers of the first conformable membrane 136 and the second conformable membrane 146 is reinforced by a reinforcing material, such as, but not limited to, glass fibers, carbon fibers, and the like.

The elastomeric material selected for the first conformable membrane 136 and the second conformable membrane 146 may depend on processing cycle parameters (e.g., heat and pressure) used during processing of the composite structure 102.

As illustrated in FIG. 12, in one or more examples, the apparatus 100, such as the first processing-tool 104, includes a first caul 142. In one or more examples, the first caul 142 is coupled to the first conformable membrane 136. In the closed position 110, the first caul 142 is configured to shape and/or smooth the outer surface 212 of the composite structure 102. For example, in the closed position 110, the first caul 142 is located between the first conformable membrane 136 and the outer surface 212 of the composite structure 102 and a portion of the composite structure 102 is located between the outer surface 210 of the mandrel-tool 112 and the first caul 142. During processing, the first caul 142 is pressed against a portion of the outer surface 212 of the composite structure 102, along with the first conformable membrane 136, to shape and/or smooth the outer surface 212 of the composite structure 102.

The first caul 142 is coupled to the first conformable membrane 136 by any suitable method or technique. In one or more examples, the first caul 142 is chemically bonded (e.g., via adhesives or other bonding agent) to the surface of the first conformable membrane 136.

As illustrated in FIG. 13, in one or more examples, the apparatus 100, such as the second processing-tool 106, includes a second caul 148. In one or more examples, the second caul 148 is coupled to the second conformable membrane 146. In the closed position 110, the second caul 148 is configured to shape and/or smooth the outer surface 212 of the composite structure 102. For example, in the closed position 110, the second caul 148 is located between the second conformable membrane 146 and the outer surface 212 of the composite structure 102 and a portion of the composite structure 102 is located between the outer surface 210 of the mandrel-tool 112 and the second caul 148. During processing, the second caul 148 is pressed against a portion of the outer surface 212 of the composite structure 102, along with the second conformable membrane 146, to shape and/or smooth the outer surface 212 of the composite structure 102.

The second caul 148 is coupled to the second conformable membrane 146 by any suitable method or technique. In one or more examples, the second caul 148 is chemically bonded (e.g., via adhesives or other bonding agent) to the surface of the second conformable membrane 146.

Generally, the first caul 142 and the second caul 148 include, or are formed by, a broad, flat, flexible piece (e.g., a sheet) of material that is substantially free of surface defects. The first caul 142 and the second caul 148 are used to intimately contact the outer surface 212 of the composite structure 102 during the processing operation to provide the composite structure 102 with a smooth outer surface.

In one or more examples, the first caul 142 and the second caul 148 are constructed from a fiber-reinforced polymer material, such as, but not limited to, carbon fiber-reinforced polymer and carbon fiber-reinforced epoxy. As examples, the first caul 142 and the second caul 148 are constructed from carbon fiber-reinforced benzoxazine or carbon fiber-reinforced bismaleimide. In one or more examples, the first caul 142 and the second caul 148 are constructed from a metallic material, such as, but not limited to aluminum. In one or more examples, the first caul 142 and the second caul 148 are constructed from a metallic alloy, such as but not limited to, a nickel-iron alloy (e.g., Invar).

In one or more examples, the first caul 142 and the second caul 148 have a thickness ranging from approximately 0.030 inch (0.76 millimeter) to approximately 0.125 inch (3.17 millimeters).

In one or more examples, an outer surface of the first caul 142 and the second caul 148 (e.g., the surface configured to contact the outer surface 212 of the composite structure 102) has a surface roughness value of between approximately 32 Ra and approximately 63 Ra.

The material and/or thickness selected for the first caul 142 and the second caul 148 may depend on processing cycle parameters (e.g., heat and pressure) used during processing of the composite structure 102.

Referring to FIGS. 1, 2, 5, 9-11, 14 and 16, in one or more examples, the apparatus 100 includes the heating system 116. The heating system 116 is configured to heat the composite structure 102, supported on the mandrel-tool 112, during processing. In one or more examples, the heating system 116 is configured to heat the composite structure 102 to a temperature sufficient to debulk the composite structure 102 and maintain the composite structure 102 at a debulking temperature for sustained period of time. A debulking process typically includes both a temperature and a pressure component as a compressive pressure removes voids and helps to consolidate during debulk. In one or more examples, the heating system 116 is configured to heat the composite structure 102 to a temperature sufficient to cure the composite structure 102 and maintain the composite structure 102 at a curing temperature for sustained period of time. A curing process typically includes both a temperature and a pressure component as a compressive pressure removes voids and helps to consolidate during cure.

In one or more examples, the heating system 116 is configured to heat the gas 118 (FIGS. 5, 6 and 9-11), located within (e.g., bound by) the vessel 114. For example, the heating system 116 is in thermal communication with the gas 118. In these examples, heat is transferred from the heated gas 118 to the composite structure 102.

In one or more examples, the heating system 116 is configured to heat the tooling assembly 164. For example, the heating system 116 is coupled to and/or is in thermal communication with at least one of the first processing-tool 104, the second processing-tool 106, the first conformable membrane 136, and/or the second conformable membrane 146. In these examples, heat is transferred from the heated tooling assembly 164 to the composite structure 102.

In one or more examples, the heating system 116 is configured to heat the mandrel-tool 112. For example, the heating system 116 is coupled to and/or is in thermal communication with the mandrel-tool 112. In these examples, heat is transferred from the mandrel-tool 112 to the composite structure 102.

In one or more examples, the heating system 116 is configured to heat at least one of, or a combination of two or more of, the first processing-tool 104, the second processing-tool 106, the gas 118 located within the vessel 114, and the mandrel-tool 112 such that the composite structure 102 is brought to and held at a desired processing temperature.

The heating system 116 includes, or takes the form of, any suitable arrangement of heating devices and/or heating elements, configured to heat a component associated with the heating devices. In one or more examples, the heating system 116 includes at least one electric heater (e.g., a resistive heat source) configured to generate electric heat. In one or more examples, the heating system 116 includes at least one gas heater (e.g., gas heat source) configured to generate gas heat. In one or more examples, the heating system 116 includes a combination of an electric heater and a gas heater.

In one or more examples, at least one heating element of the heating system 116, such as a resistive heating element, is coupled to and is in thermal communication with the first processing-tool 104, such the first vessel-wall 134 and the first vessel-ends 194.

In one or more examples, at least one heating element of the heating system 116, such as a resistive heating element, is coupled to and is in thermal communication with at least one of the first conformable membrane 136 and/or the first caul 142. Situating the heating element of the heating system 116 on the first conformable membrane 136 and/or the first caul 142 may facilitate efficient heat transfer to the composite structure 102. Additionally, situating the heating element of the heating system 116 on the first conformable membrane 136 and/or the first caul 142 may enable selective heating of different areas or portions of the composite structure 102. For example, thicker portions of the composite structure 102 may be heated more than thinner portions of the composite structure 102.

In one or more examples, the heating system 116, such as an electric heater, is coupled to and is in thermal communication with the second processing-tool 106, such as the second vessel-wall 144 and/or the second vessel-ends 196.

In one or more examples, at least one heating element of the heating system 116, such as a resistive heating element, is coupled to and is in thermal communication with at least one of the second conformable membrane 146 and/or the second caul 148. Situating the heating element of the heating system 116 on the second conformable membrane 146 and/or the second caul 148 may facilitate efficient heat transfer to the composite structure 102. Additionally, situating the heating element of the heating system 116 on the second conformable membrane 146 and/or the second caul 148 may enable selective heating of different areas or portions of the composite structure 102. For example, thicker portions of the composite structure 102 may be heated more than thinner portions of the composite structure 102

In one or more examples, at least one heating element of the heating system 116, such as a resistive heating element, is coupled to and is in thermal communication with the mandrel-tool 112.

In one or more examples, at least one heating element of the heating system 116, such as an electric heat exchanger or a gas heat exchanger, is positioned in thermal communication with the gas 118 to heat the gas 118 located within the vessel 114. In one or more examples, the heating system 116 heats the gas 118 prior to the gas 118 being introduced within the vessel 114 (e.g., a pre-heated gas). In one or more examples, the heating system 116 heats the gas 118 subsequent to the gas 118 being introduced within the vessel 114 (e.g., post-heated gas).

Referring still to FIGS. 1, 2, 5, 9-11, 14 and 16, in one or more examples, the apparatus 100 includes the pressurization system 140. The pressurization system 140 is coupled to and is in communication with the tooling assembly 164, such as at least one of the first processing-tool 104 and the second processing-tool 106. In the closed position 110, with the tooling assembly 164 and the mandrel-tool 112 sealed together, the pressurization system 140 is configured to pressurize the gas 118 (FIGS. 5, 6 and 9-11) located within the vessel 114. In these examples, the apparatus 100 uses positive pressure to process the composite structure 102.

As illustrated in FIGS. 5 and 9, in one or more examples, the apparatus 100 uses positive pressure applied to the composite structure 102 by the pressurized gas 118 to process (e.g., compact, debulk, or cure) the composite structure 102, such as to compress the composite structure 102 against the outer surface 210 of the mandrel-tool 112.

As illustrated in FIGS. 5 and 9, in one or more examples, in the closed position 110, the gas 118 located between (e.g., bound by) the first vessel-wall 134, the first vessel-ends 194, and the mandrel-tool 112 is pressurized using the pressurization system 140. The pressurized gas 118 applies positive pressure to the composite structure 102 to compress a portion of the composite structure 102 against the outer surface 210 of the mandrel-tool 112.

As illustrated in FIG. 5, in one or more examples, in the closed position 110, the gas 118 located between (e.g., bound by) the second vessel-wall 144, the second vessel-ends 196, and the mandrel-tool 112 is pressurized using the pressurization system 140. The pressurized gas 118 applies positive pressure to the composite structure 102 to compress a portion of the composite structure 102 against the outer surface 210 of the mandrel-tool 112.

In one or more examples, in the closed position 110, the gas 118 bound by the first vessel-wall 134, the first vessel-ends 194, the second vessel-wall 144, the second vessel-ends 196, and the mandrel-tool 112. In the closed position 110, the pressurization system 140 is configured to pressurize the gas 118 located between (e.g., bound by) the first vessel-wall 134, the first vessel-ends 194, the second vessel-wall 144, the second vessel-ends 196, and the mandrel-tool 112 to compress the composite structure 102 against the outer surface 210 of the mandrel-tool 112.

In one or more examples, the pressurized gas 118 applies positive pressure directly to the outer surface 212 of the composite structure 102 to compress the composite structure 102. In one or more examples, the distance between the first vessel-wall 134 and the outer surface 212 of the composite structure 102 is relatively small (e.g., a few inches or less), which forms a relatively small volume that is required to be pressurized during processing of the composite structure 102. In one or more examples, the distance between the second vessel-wall 144 and the outer surface 212 of the composite structure 102 is relatively small (e.g., a few inches or less), which forms a relatively small volume that is required to be pressurized during processing of the composite structure 102.

In one or more examples, as illustrated in FIGS. 5 and 9, the pressurized gas 118 applies positive pressure directly to the compression bagging 162, surrounding the composite structure 102, and, in turn, the compression bagging 162 is pressed against the outer surface 212 of the composite structure 102 to compress the composite structure 102 between the compression bagging 162 and the mandrel-tool 112. In one or more examples, the distance between the first vessel-wall 134 and the compression bagging 162, surrounding the composite structure 102, is relatively small (e.g., a few inches or less), which forms a relatively small volume that is required to be pressurized during processing of the composite structure 102. In one or more examples, the distance between the first vessel-wall 134 and the compression bagging 162, surrounding the composite structure 102, is relatively small (e.g., a few inches or less), which forms a relatively small volume that is required to be pressurized during processing of the composite structure 102.

In one or more examples, as illustrated in FIGS. 6, 10 and 11, the pressurized gas 118 applies positive pressure directly to the first conformable membrane 136 and, in turn, the first conformable membrane 136 is pressed against the outer surface 212 of the composite structure 102 to compress the composite structure 102 between the first conformable membrane 136 and the mandrel-tool 112. In these examples, the pressurized gas 118 is bound by the first vessel-wall 134, the first vessel-ends 194, and the first conformable membrane 136. In one or more examples, the distance between the first vessel-wall 134 and outer surface 212 of the composite structure 102, the distance between the first vessel-wall 134 and the first conformable membrane 136, and/or the distance between the first conformable membrane 136 and the outer surface 212 of the composite structure 102 is relatively small (e.g., a few inches or less), which forms a relatively small volume that is required to be pressurized during processing of the composite structure 102.

In one or more examples, as illustrated in FIG. 6, the pressurized gas 118 applies positive pressure directly to the second conformable membrane 146 and, in turn, the second conformable membrane 146 is pressed against the outer surface 212 of the composite structure 102 (e.g., with or without the compression bagging 162) to compress the composite structure 102 between the second conformable membrane 146 and the mandrel-tool 112. In these examples, the pressurized gas 118 is bound by the second vessel-wall 144, the second vessel-ends 196, and the second conformable membrane 146. In one or more examples, the distance between the second vessel-wall 144 and outer surface 212 of the composite structure 102, the distance between the second vessel-wall 144 and the second conformable membrane 146, and/or the distance between the second conformable membrane 146 and the outer surface 212 of the composite structure 102 is relatively small (e.g., a few inches or less), which forms a relatively small volume that is required to be pressurized during processing of the composite structure 102.

In one or more examples, in the closed position 110, one of the first processing-tool 104 or the second processing-tool 106 is in communication with the pressurization system 140 and the first processing-tool 104 and the second processing-tool 106 are in fluid communication with each other such that the pressurization system 140 is configured to pressurizes the gas 118 bound by (e.g., located between) the first vessel-wall 134, the first vessel-ends 194, the second vessel-wall 144, the second vessel-ends 196, and the mandrel-tool 112.

In one or more examples, each one of the first processing-tool 104 and the second processing-tool 106 is coupled to and is in communication with the pressurization system 140 such that the pressurization system 140 is configured to pressurizes the gas 118 bound by (e.g., located between) the first vessel-wall 134, the first vessel-ends 194, the second vessel-wall 144, the second vessel-ends 196, and the mandrel-tool 112.

In one or more examples, the apparatus 100 includes more than one pressurization system 140, in which a dedicated pressurization system 140 is coupled to and is in communication with each one of the first processing-tool 104 and the second processing-tool 106. In these examples, a first pressurization system is associated with the first processing-tool 104 and is configured to pressurizes the gas 118 bound by (e.g., located between) the first vessel-wall 134, the first vessel-ends 194, and the mandrel-tool 112. A second pressurization system is associated with the second processing-tool 106 and is configured to pressurizes the gas 118 bound by (e.g., located between) the second vessel-wall 144, the second vessel-ends 196, and the mandrel-tool 112.

As illustrated in FIGS. 6, 10 and 11, in one or more examples, the apparatus 100 uses positive pressure applied to at least one of the first conformable membrane 136 and the second conformable membrane 146 by the pressurized gas 118 to press at least one of the first conformable membrane 136 and the second conformable membrane 146 against the composite structure 102 and process the composite structure 102, such as to compress the composite structure 102 against the outer surface 210 of the mandrel-tool 112.

As illustrated in FIGS. 6, 10 and 11, in one or more examples, in the closed position 110, the pressurization system 140 is configured to apply positive pressure between the first vessel-wall 134 and the first conformable membrane 136. For example, the first perimeter 220 of the first conformable membrane 136 is connected to and is sealed to the first vessel-wall 134 and the first vessel-ends 194. The gas 118 bound by (e.g., located between) the first vessel-wall 134, the first vessel-ends 194, and first conformable membrane 136 is pressurized using the pressurization system 140. The pressurized gas 118 applies positive pressure between the first vessel-wall 134 and the first conformable membrane 136 to press the first conformable membrane 136 against the composite structure 102 and compress the composite structure 102 against the mandrel-tool 112. Thus, in these examples, the first conformable membrane 136 serves as an alternative to consumable compression bagging or vacuum bagging typically used in composite processing.

As illustrated in FIG. 6, in one or more examples, in the closed position 110, the pressurization system 140 is configured to apply positive pressure between the second vessel-wall 144 and the second conformable membrane 146. For example, the second perimeter 226 of the second conformable membrane 146 is connected to and is sealed to the second vessel-wall 144 and the second vessel-ends 196. The gas 118 bound by (e.g., located between) the second vessel-wall 144, the second vessel-ends 196 (FIGS. 3 and 4), and second conformable membrane 146 is pressurized using the pressurization system 140. The pressurized gas 118 applies positive pressure between the second vessel-wall 144 and the second conformable membrane 146 to press the second conformable membrane 146 against the composite structure 102 and compress the composite structure 102 against the mandrel-tool 112. Thus, in these examples, the second conformable membrane 146 serves as an alternative to consumable compression bagging or vacuum bagging typically used in composite processing.

In one or more examples, in the closed position 110, the tooling assembly 164 is configured such that the pressurization system 140 is configured to concurrently pressurize the gas 118 bound by (e.g., located between) the first vessel-wall 134, the first vessel-ends 194, and the first conformable membrane 136 and the gas 118 bound by (e.g., located between) the second vessel-wall 144, the second vessel-ends 196, and the second conformable membrane 146 to compress the composite structure 102 against the outer surface 210 of the mandrel-tool 112.

In one or more examples, in the closed position 110, one of the first processing-tool 104 or the second processing-tool 106 is coupled to and is in communication (e.g., fluid communication) with the pressurization system 140. The first processing-tool 104 and the second processing-tool 106 are in fluid communication with each other such that the pressurization system 140 is configured to concurrently pressurize the gas 118 bound by (e.g., located between) the first vessel-wall 134, the first vessel-ends 194, and the first conformable membrane 136 and the gas 118 bound by (e.g., located between) the second vessel-wall 144, the second vessel-ends 196, and the second conformable membrane 146.

In another one of these examples, each one of the first processing-tool 104 and the second processing-tool 106 is coupled to and is in communication (e.g., fluid communication) with the pressurization system 140 such that the pressurization system 140 is configured to independently pressurize the gas 118 bound by (e.g., located between) the first vessel-wall 134, the first vessel-ends 194, and the first conformable membrane 136 and to independently pressurize the gas 118 bound by (e.g., located between) the second vessel-wall 144, the second vessel-ends 196, and the second conformable membrane 146.

In one or more examples, the apparatus 100 includes more than one pressurization system 140, in which a dedicated pressurization system 140 is coupled to and is in communication with each one of the first processing-tool 104 and the second processing-tool 106. In these examples, a first pressurization system is associated with the first processing-tool 104 and is configured to pressurize the gas 118 bound by (e.g., located between) the first vessel-wall 134, the first vessel-ends 194, and the first conformable membrane 136. A second pressurization system is associated with the second processing-tool 106 and is configured to pressurizes the gas 118 bound by (e.g., located between) the second vessel-wall 144, the second vessel-ends 196, and the second conformable membrane 146.

The pressurization system 140 includes any one of or a combination of various types of systems configured to control pressure inside of the sealed vessel 114.

In one or more examples, the pressurization system 140 is configured to utilize liquid nitrogen, which is permitted to change to a gaseous state as it is introduced within the sealed vessel 114. Expansion of the nitrogen increases the pressure within the sealed vessel 114.

In one or more examples, the pressurization system 140 includes a compressor or a pump that is coupled to the first processing-tool 104 and the second processing-tool 106 and that is in fluid communication with an interior volume of the vessel 114. Operation of the compressor or pump is configured to selectively control the pressure within the sealed vessel 114.

In one or more examples, pressurization of the sealed vessel 114 is controlled by increasing the temperature of the gas 118 located within the sealed vessel 114. Increasing the temperature of the gas 118 within the sealed vessel 114 expands the gas 118, which results in an increase in pressure within the sealed vessel 114. In one or more examples, the temperature of the gas 118 is controlled via the heating system 116, as described above.

Referring to FIGS. 12, 13 and 18, in one or more examples, in the closed position 110, the tooling assembly 164 is configured to transfer the gas 118, as pressurized and/or heated, between the first processing-tool 104 and the second processing-tool 106. For example, in the closed position 110, the tooling assembly 164 is configured to provide a path for transferring the gas 118 between the first processing-tool 104 and the second processing-tool 106. These examples are advantageous where the first conformable membrane 136 and the second conformable membrane 146 are coupled to the first processing-tool 104 and the second processing-tool 106, respectively, and are used to compress the composite structure 102 against the mandrel-tool 112.

As illustrated in FIGS. 12 and 18, in one or more examples, the first processing-tool 104 includes a first bulkhead 150. The first bulkhead 150 is coupled to the first vessel-wall 134 and extends from the first vessel-wall 134. In one or more examples, the first processing-tool 104 includes more than one first bulkhead 150. In one or more examples, as illustrated in FIG. 12, the first processing-tool 104 includes two first bulkheads 150. Each first bulkhead 150 extends along a portion of the first interface-surface 120 that is configured to interface with or contact the second processing-tool 106. Only one first bulkhead 150 is illustrated in FIG. 18.

As illustrated in FIGS. 13 and 18, in one or more examples, the second processing-tool 106 includes a second bulkhead 154. The second bulkhead 154 is coupled to and extends from the second vessel-wall 144. In one or more examples, the second processing-tool 106 includes more than one second bulkhead 154. In one or more examples, as illustrated in FIG. 13, the second processing-tool 106 includes two second bulkheads 154. Each second bulkhead 154 extends along a portion of the second interface-surface 128 that is configured to interface with or contact the first processing-tool 104. Only one second bulkhead 154 is illustrated in FIG. 18.

Referring to FIG. 18, in one or more examples, the first bulkhead 150 includes a first aperture 152. In one or more examples, as illustrated in FIG. 12, the first bulkhead 150 includes a plurality of first apertures 152. In one or more examples, the second bulkhead 154 includes a second aperture 156. In one or more examples, as illustrated in FIG. 13, the second bulkhead 154 includes a plurality of second apertures 156.

As illustrated in FIG. 18, in the closed position 110, the first bulkhead 150 and the second bulkhead 154 contact each other so that the first aperture 152, or the plurality of first apertures 152 (FIG. 12), and the second aperture 156, or the plurality of second apertures 156 (FIG. 13), align with each other for passage of the gas 118 between the first processing-tool 104 and the second processing-tool 106, such as in the direction of arrow 198.

As illustrated in FIG. 18, in one or more examples, the gas 118 moves from a vessel-first portion 114-1 of the vessel 114, formed by the first processing-tool 104 and the mandrel-tool 112, to a vessel-second portion 114-2 of the vessel 114, formed by the second processing-tool 106 and the mandrel-tool 112, through the aligned first aperture 152 and second aperture 156 (e.g., in the direction of arrow 198). In some examples, such as those in which the first bulkheads 150 and the second bulkheads 154 are located along an entirety of the first interface 124 between the first processing-tool 104 and the second processing-tool 106, as illustrated in FIGS. 12 and 13, the gas 118 is able to circulate through the vessel 114, such as between the first processing-tool 104 and the second processing-tool 106 and around the composite structure 102. In other words, in combination, the first bulkhead 150 and the second bulkhead 154, with alignment of the associated first apertures 152 and second apertures 156, function as a manifold that is configured to share a supply of gas 118 between the first processing-tool 104 and the second processing-tool 106.

As illustrated in FIG. 18, in one or more examples, the first bulkhead 150 includes a first aperture-seal 200 that extends around a perimeter of the first aperture 152. In one or more examples, alternatively, or in addition to, the second bulkhead 154 includes a second aperture-seal 202 that extends around a perimeter of the second aperture 156. In the closed position 110, the first aperture-seal 200 and/or the second aperture-seal 202 form a seal between the first bulkhead 150 and the second bulkhead 154, around the aligned first aperture 152 and second aperture 156, for the passage of the gas 118. The first aperture-seal 200 and/or the second aperture-seal 202 prevent the gas 118 from entering the space between the first conformable membrane 136, the second comfortable membrane 146, and the composite structure 102.

Figure 19:
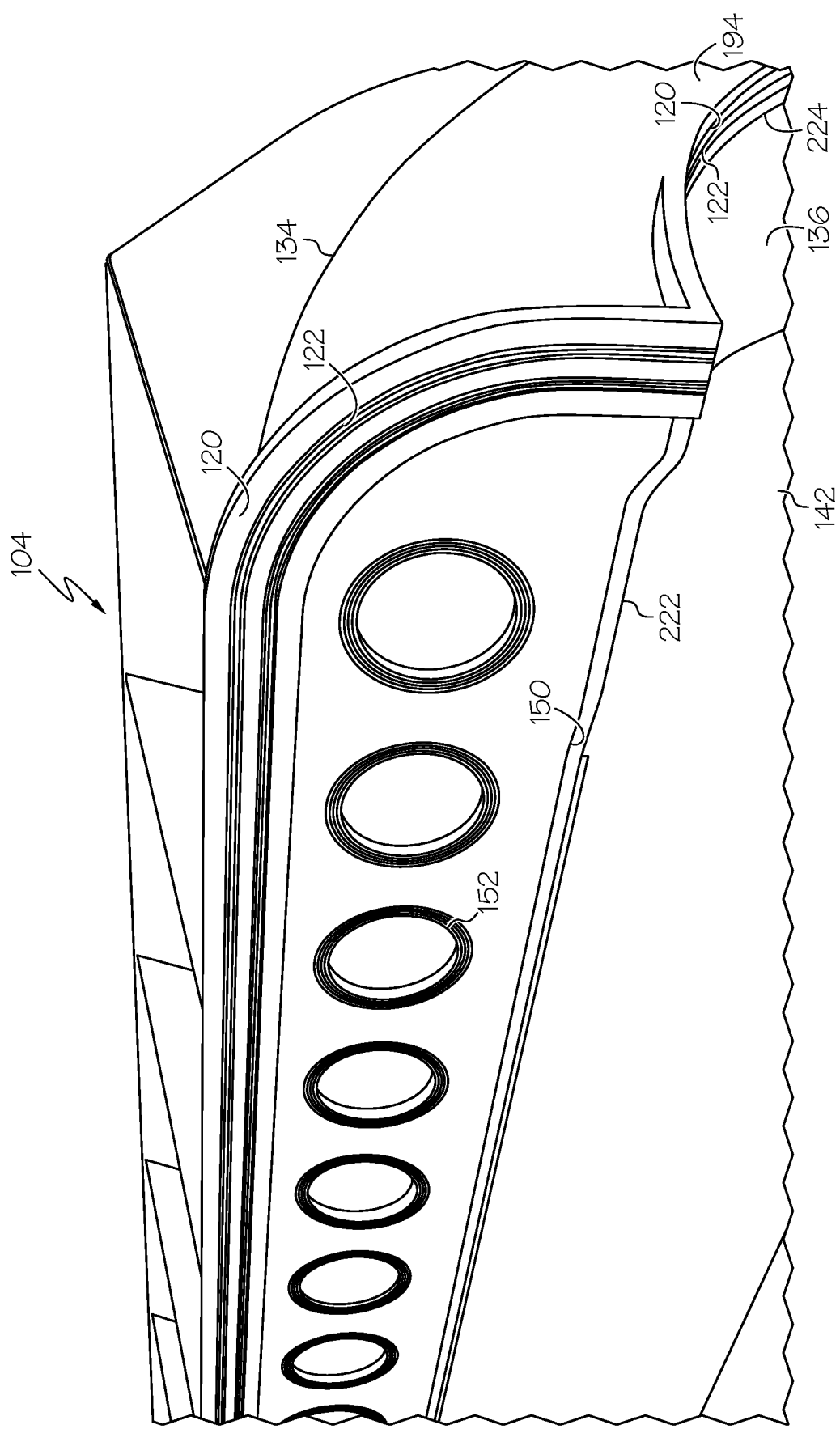
FIG. 19 is a schematic, perspective view of an example of a portion of the first processing-tool.

FIGS. 19 and 20 schematically illustrate examples of a portion of the first processing-tool 104, including the first bulkhead 150 and the first conformable membrane 136. While not explicitly illustrated, examples of an equivalent portion of the second processing-tool 106, including the second bulkhead 154 and the second conformable membrane 146 are equally represented in FIGS. 19 and 20.

Referring to FIGS. 18-20, in one or more examples, the first conformable membrane 136 is coupled to the first bulkhead 150. In one or more examples, the first conformable membrane 136 is sealed to the first bulkhead 150. In one or more examples, the opposing first perimeter-first sides 222 of the first conformable membrane 136 are coupled to and are sealed to the first bulkheads 150 (only one first bulkhead 150 and one first perimeter-first side 222 of the first conformable membrane 136 are illustrated in FIGS. 18-20).

In one or more examples, the first bulkhead 150 supports the first conformable membrane 136. In the closed position 110, the first bulkhead 150 locates the first conformable membrane 136 in closer proximity to the surface of the composite structure 102 than the first vessel-wall 134. The first processing-tool 104 may have any number of (e.g., one or more) first bulkheads 150 coupled to the first vessel-wall 134 and supporting the first conformable membrane 136 at any number of locations.

In one or more examples, the second conformable membrane 146 is coupled to the second bulkhead 154. In one or more examples, the second conformable membrane 146 is sealed to the second bulkhead 154. In one or more examples, the opposing second perimeter-first sides 228 of the second conformable membrane 146 are coupled to and are sealed to the second bulkheads 154 (only one second bulkhead 154 and one second perimeter-first side 228 of the second conformable membrane 146 are illustrated in FIG. 18).

In one or more examples, the second bulkhead 154 supports the second conformable membrane 146. In the closed position 110, the second bulkhead 154 locates the second conformable membrane 146 in closer proximity to the surface of the composite structure 102 than the second vessel-wall 144. The second processing-tool 106 may have any number of (e.g., one or more) second bulkheads 154 coupled to the second vessel-wall 144 and supporting the second conformable membrane 146 at any number of locations.

Referring to FIGS. 1, 2, 5, 9-11, 14 and 16, in one or more examples, the apparatus 100 includes the vacuum system 138. In one or more examples, the vacuum system 138 is in fluid communication a volume formed between the outer surface 210 of the mandrel-tool 112 and the compression bagging 162 (FIGS. 5 and 9). In one or more examples, the vacuum system 138 is in fluid communication a volume formed between the outer surface 210 of the mandrel-tool 112 and the first conformable membrane 136 (FIGS. 6, 10 and 11) or the volume formed between the outer surface 210 of the mandrel-tool 112 and the first conformable membrane 136 and the second conformable membrane 146 (FIG. 6). In other words, in the closed position 110, with the tooling assembly 164 and the mandrel-tool 112 sealed together, the vacuum system 138 is configured to apply vacuum within the vessel 114, for example, between the mandrel-tool 112 and one of the compression bagging 162 (FIGS. 5 and 9), the first conformable membrane 136 (FIGS. 6, 10 and 11), or, the first conformable membrane 136 and the second conformable membrane 146 (FIG. 6). In these examples, the apparatus 100 uses negative pressure to process the composite structure 102.

As illustrated in FIGS. 6, 10 and 11, in one or more examples, the vacuum system 138 is configured to apply vacuum between the first conformable membrane 136 and the mandrel-tool 112. The vacuum applies negative pressure to evacuate gas between the first conformable membrane 136 and the outer surface 210 of the mandrel-tool 112. Evacuating the gas between the first conformable membrane 136 and the outer surface 210 of the mandrel-tool 112 facilitates higher pressure outside of the first conformable membrane 136, thus pushing the first conformable membrane 136 against the outer surface 212 of the composite structure 102 and resulting in compression of the composite structure 102 against the outer surface 210 of the mandrel-tool 112.

As illustrated in FIG. 6, in one or more examples, the vacuum system 138 is configured to apply vacuum between the second conformable membrane 146 and the mandrel-tool 112. The vacuum applies negative pressure to evacuate gas between the second conformable membrane 146 and the outer surface 210 of the mandrel-tool 112. Evacuating the gas between the second conformable membrane 146 and the outer surface 210 of the mandrel-tool 112 facilitates higher pressure outside of the second conformable membrane 146, thus pushing the first conformable membrane 136 against the outer surface 212 of the composite structure 102 and resulting in compression of the composite structure 102 against the outer surface 210 of the mandrel-tool 112

In one or more examples, the vacuum system 138 includes one or more vacuum pumps. In one or more examples, the vacuum system 138 is coupled to the mandrel-tool 112. In one or more examples, the vacuum system 138 is coupled to the tooling assembly 164, such as at least one of the first processing-tool 104 and/or the second processing-tool 106. In one or more examples, the vacuum system 138 is coupled to the tooling assembly 164 and to the mandrel-tool 112.

Referring to FIGS. 1, 2, 14, 15 and 21, in one or more examples, the vacuum system 138 is coupled to the mandrel-tool 112 via a mandrel-manifold 206. As illustrated in FIG. 21, in one or more examples, the mandrel-tool 112 includes a plurality of vacuum apertures 240 formed through the outer surface 210 of the mandrel-tool 112. Generally, the vacuum apertures 240 are situated toward ends of the mandrel-tool 112 beyond a perimeter boundary of the composite structure 102, supported on the mandrel-tool 112. The vacuum apertures 240 are in fluid communication with the mandrel-manifold 206 via a plurality of mandrel-vacuum lines 242.

Referring to FIGS. 1, 2, 14, 15 and 20, in one or more examples, the vacuum system 138 is coupled to the tooling assembly 164, such as the first processing-tool 104 and/or the second processing-tool 106, via a tooling-manifold 204. As illustrated in FIG. 20, in one or more examples, the tooling assembly 164, such as the first processing-tool 104 and/or the second processing-tool 106, include at least one vacuum connection 246 situated on or coupled to the first conformable membrane 136 and/or the second conformable membrane 146 (not illustrated in FIG. 20). The vacuum connection 246 is in fluid communication with the tooling-manifold 204 via a plurality of tool-vacuum lines 244. The vacuum connection 246 associated with the first conformable membrane 136 (FIG. 20) is in fluid communication with the volume between the first conformable membrane 136 and the outer surface 212 of the mandrel-tool 112. The vacuum connection 246 associated with the second conformable membrane 146 (not illustrated in FIG. 20) is in fluid communication with the volume between the second conformable membrane 146 and the outer surface 212 of the mandrel-tool 112.

As illustrated in FIGS. 5 and 9, in one or more examples, the apparatus 100 includes the compression bagging 162. The compression bagging 162 is configured to surround the composite structure 102, supported by the mandrel-tool 112. Generally, the compression bagging 162 is a consumable item. In one or more examples, the compression bagging 162 is hermetically sealed to the outer surface 210 of the mandrel-tool 112 around the composite structure 102. In one or more examples, the compression bagging 162 is applied to the composite structure 102 before the tooling assembly 164 closed and sealed to the mandrel-tool 112 to form the vessel 114 around the composite structure 102.

In one or more examples, the pressurization system 140 is configured to apply positive pressure between the first vessel-wall 134 and the compression bagging 162 (FIGS. 5 and 9). In one or more examples, the pressurization system 140 is configured to apply positive pressure between the second vessel-wall 144 and the compression bagging 162 (FIG. 5). In these examples, the compression bagging 162 is pressed (e.g., pushed) against the outer surface 212 of the composite structure 102 by the pressurized gas 118 located within the vessel 114 to compress the composite structure 102 between the compression bagging 162 and the outer surface 210 of the mandrel-tool 112.

In one or more examples, the compression bagging 162 protects the composite structure 102 from interaction with the gas 118 located within the vessel 114. In one or more examples, the gas 118 is air. In one or more examples, the gas 118 is an inert gas, such as nitrogen.

In one or more examples, the vacuum system 138 is configured to apply vacuum between the mandrel-tool 112 and the compression bagging 162. In these examples, a perimeter of the compression bagging 162 is coupled to and is sealed to the outer surface 210 of the mandrel-tool 112 beyond the location of the vacuum apertures 240 (FIG. 21) formed in the mandrel-tool 112. The vacuum applies negative pressure to evacuate gas between the compression bagging 162 and the outer surface 210 of the mandrel-tool 112. Evacuating the gas between the compression bagging 162 and the outer surface 210 of the mandrel-tool 112 facilitates higher pressure outside of the compression bagging 162, thus pushing the compression bagging 162 against the outer surface 212 of the composite structure 102 and resulting in compression of the composite structure 102 against the outer surface 210 of the mandrel-tool 112.

While the example configuration of the tooling assembly 164 shown in FIG. 11 illustrates use of the first conformable membrane 136, in other examples of this configuration of the tooling assembly 164, the compression bagging 162 is sealed to the mandrel-tool 112 and surrounds the composite structure 102.

In various examples, the first conformable membrane 136 and/or the second conformable membrane 146 take the place of or serve a substantially similar purpose as the compression bagging 162. In these examples, the apparatus 100 beneficially reduces the use of consumable materials, such as the compression bagging 162. In other examples, the apparatus 100 used both the compression bagging 162 and the first conformable membrane 136 and/or the second conformable membrane 146

Referring to FIGS. 1, 2, 14, 16 and 20, in one or more examples, the tooling-manifold 204 is located on or is associated with the first processing-tool 104. The tooling-manifold 204 enables connection (e.g., electrical, data, fluid, etc.) of the pressurization system 140, the heating system 116, and/or the vacuum system 138 to the tooling assembly 164. The tooling-manifold 204 advantageously enables operational connection of the pressurization system 140, the heating system 116, and the vacuum system 138 to the tooling assembly 164 on the exterior of the vessel 114.

In examples in which the first processing-tool 104 and the second processing-tool 106 are in fluid communication with each other, such as the examples illustrated in FIGS. 12, 13 and 18-20, the tooling assembly 164 may only use one tooling-manifold 204, associated with one of the first processing-tool 104 or the second processing-tool 106. In examples in which the first processing-tool 104 and the second processing-tool 106 are not in fluid communication with each other, the tooling assembly may use two tooling-manifolds 204 (only one tooling-manifold 204 is illustrated), each one of the tooling-manifolds 204 being associated with a respective one of the first processing-tool 104 and the second processing-tool 106.

In one or more examples, the tooling-manifold 204 is configured to route the gas 118 that is heated by the heating system 116 into the vessel 114.

In one or more examples, the tooling-manifold 204 is configured to route electrical power to the heating system 116 to heat at least one of the first vessel-wall 134, the second vessel-wall 144, the first conformable membrane 136, the second conformable membrane 146, the first caul 142, and the second caul 148.

In one or more examples, the tooling-manifold 204 is configured to route the gas 118 that is pressurized by the pressurization system 140 into the vessel 114.

Referring to FIGS. 1, 2, 14, 16 and 21, in one or more examples, the mandrel-manifold 206 enables connection (e.g., electrical, data, fluid, etc.) of the vacuum system 138 and the heating system 116 to the mandrel-tool 112. The mandrel-manifold 206 advantageously enables operational connection of the vacuum system 138 and the heating system 116 to the mandrel-tool 112 on the exterior of the vessel 114.

In one or more examples, the mandrel-manifold 206 is configured to route gas that is removed by the vacuum system 138 from between the compression bagging 162 and the mandrel-tool 112 or between the first conformable membrane 136 and/or second conformable membrane 146 and the mandrel-tool 112.

In one or more examples, the mandrel-manifold 206 is configured to route electrical power to the heating system 116 to heat the mandrel-tool 112.

In one or more examples, the composite structure 102 may include a portion having a closed cross-sectional shape with an open interior. For example, the composite structure 102 may include a panel and a stiffener (e.g., a hat stringer) coupled to the panel. In such examples, an inflatable bladder (not illustrated) is located within the open interior formed by the closed cross-sectional shape of the panel and the stiffener. In one or more examples, the mandrel-manifold 206 is also configured to route pressurized gas, such as from the pressurization system 140, to the inflatable bladder from an exterior of the tooling assembly 164. Generally, the inflatable bladders are located within a hollow space formed by the closed cross-sectional shape of the panel and the stiffener (e.g., within the hat stringer) to prevent the stiffener (e.g., stringer) from being crushed during processing.

As best illustrated in FIG. 2, in one or more examples, in the closed position 110, a portion of the mandrel-tool 112 is located outside of the vessel 114. For example, the opposed end portions 214 of the mandrel-tool 112 extend from the tooling assembly 164 (e.g., extend beyond the first vessel-ends 194 and the second vessel-ends 196) and are located on the exterior of the vessel 114. This configuration enables connection and disconnection of the heating system 116 and/or the vacuum system 138, for example, to the mandrel-manifold 206, while the mandrel-tool 112 is located within the tooling assembly 164 in the closed position 110.

Referring to FIGS. 2, 4 and 8, in one or more examples, the apparatus 100 includes a pair of endcaps 158. Only one of the endcaps 158 is visible in FIGS. 2, 4 and 8. The endcaps 158 are configured to seal open ends 232 (FIGS. 3 and 7) of the mandrel-tool 112. Only one of the open ends 232 of the mandrel-tool 112 is visible in FIGS. 3 and 7. For example, the endcaps 158 seal the open ends 232 of the mandrel-tool 112 and enclose an interior volume 160 of the mandrel-tool 112 such that the interior volume 160 can be pressurized during processing of the composite structure 102.

In one or more examples, the endcaps 158 are configured to be coupled to and hermetically sealed around the open ends 232 of the mandrel-tool 112, which are located external to the tooling assembly 164. Sealing the open ends 232 with the endcaps 158 encloses and seals the interior volume 160 of the mandrel-tool 112. With the interior volume 160 of the mandrel-tool 112 sealed, the interior volume 160 can be pressurized, for example, using the pressurization system 140. Pressurizing the interior volume 160 of the mandrel-tool 112 increases the structural integrity of the mandrel-tool 112 to react to the positive pressure applied to the mandrel-tool 112 by the tooling assembly 164 during processing.

In one or more examples, the endcaps 158 are coupled to, or form a portion of, the tooling assembly 164. In one or more examples, the endcaps 158 are coupled to, or form a portion of, the mandrel-tool 112.

In one or more examples, the mandrel-manifold 206 is configured to route pressurized gas, such as from the pressurization system 140, into the interior volume 160 of the mandrel-tool 112.

As best illustrated in FIGS. 1 and 2, in one or more examples, the apparatus 100 includes the processing cart 184. The processing cart 184 is configured to support the mandrel-tool 112 during processing. In the closed position 110, the processing cart 184, for example, an entirety of the processing cart 184, is located outside of the vessel 114. Locating the processing cart 184 outside of the vessel 114 formed by the tooling assembly 164 and the mandrel-tool 112 reduces the volume required to process the composite structure 102 and reduces the thermal mass that is heated during processing of the composite structure 102, thus reducing cycle time and reducing the energy required to process the composite structure 102.

Figure 22:
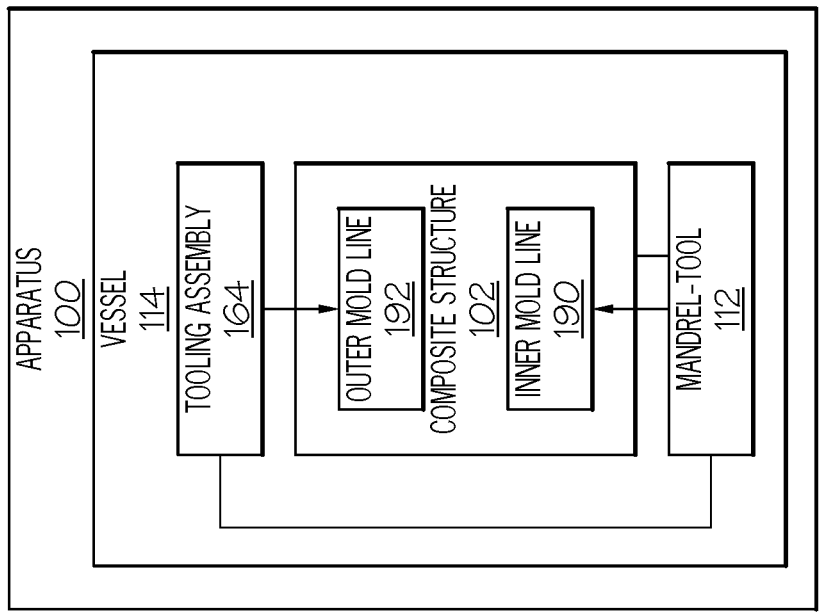
FIG. 22 is a schematic block diagram of an example of the apparatus.

Referring to FIG. 22, in one or more examples, the mandrel-tool 112 is configured to shape an inner mold line 190 of the composite structure 102. In these examples, the tooling assembly 164, such as the first processing-tool 104 or the first processing-tool 104 and the second processing-tool 106, is configured to shape an outer mold line 192 of the composite structure 102. In an example, the first conformable membrane 136 or the first caul 142 shapes at least a portion of the outer mold line 192 of the composite structure 102. In an example, the first conformable membrane 136 or the first caul 142 shapes a portion of the outer mold line 192 of the composite structure 102 and the second conformable membrane 146 or the second caul 148 shapes another portion of the outer mold line 192.

Figure 23:
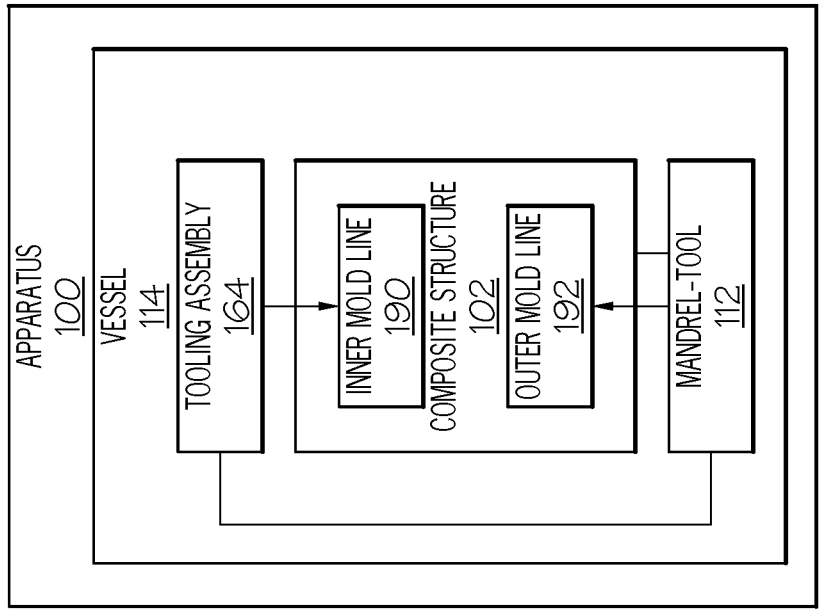
FIG. 23 is a schematic block diagram of an example of the apparatus.

Referring to FIG. 23, in one or more examples, the mandrel-tool 112 is configured to shape the outer mold line 192 of the composite structure 102. In these examples, the tooling assembly 164, such as the first processing-tool 104 or the first processing-tool 104 and the second processing-tool 106, is configured to shape the inner mold line 190 of the composite structure 102. In an example, the first conformable membrane 136 or the first caul 142 shapes at least a portion of the inner mold line 190 of the composite structure 102. In an example, the first conformable membrane 136 or the first caul 142 shapes a portion of the inner mold line 190 of the composite structure 102 and the second conformable membrane 146 or the second caul 148 shapes another portion of the inner mold line 190.

As described above and generally illustrated in FIGS. 3-11, the tooling assembly 164 has a cross-sectional shape that is complementary to a cross-sectional shape of the mandrel-tool 112 and the composite structure 102, supported by the mandrel-tool 112. The cross-sectional shape of the tooling assembly 164 being complementary to and approximately matching the cross-sectional shape of the mandrel-tool 112 advantageously reduces the size of the equipment needed to adequately process the composite structure 102 compared to conventional autoclave or oven processing equipment. This reduction in overall size beneficially improves the efficiency of the apparatus 100 and provides a smaller footprint for facility layout.

Figure 24:
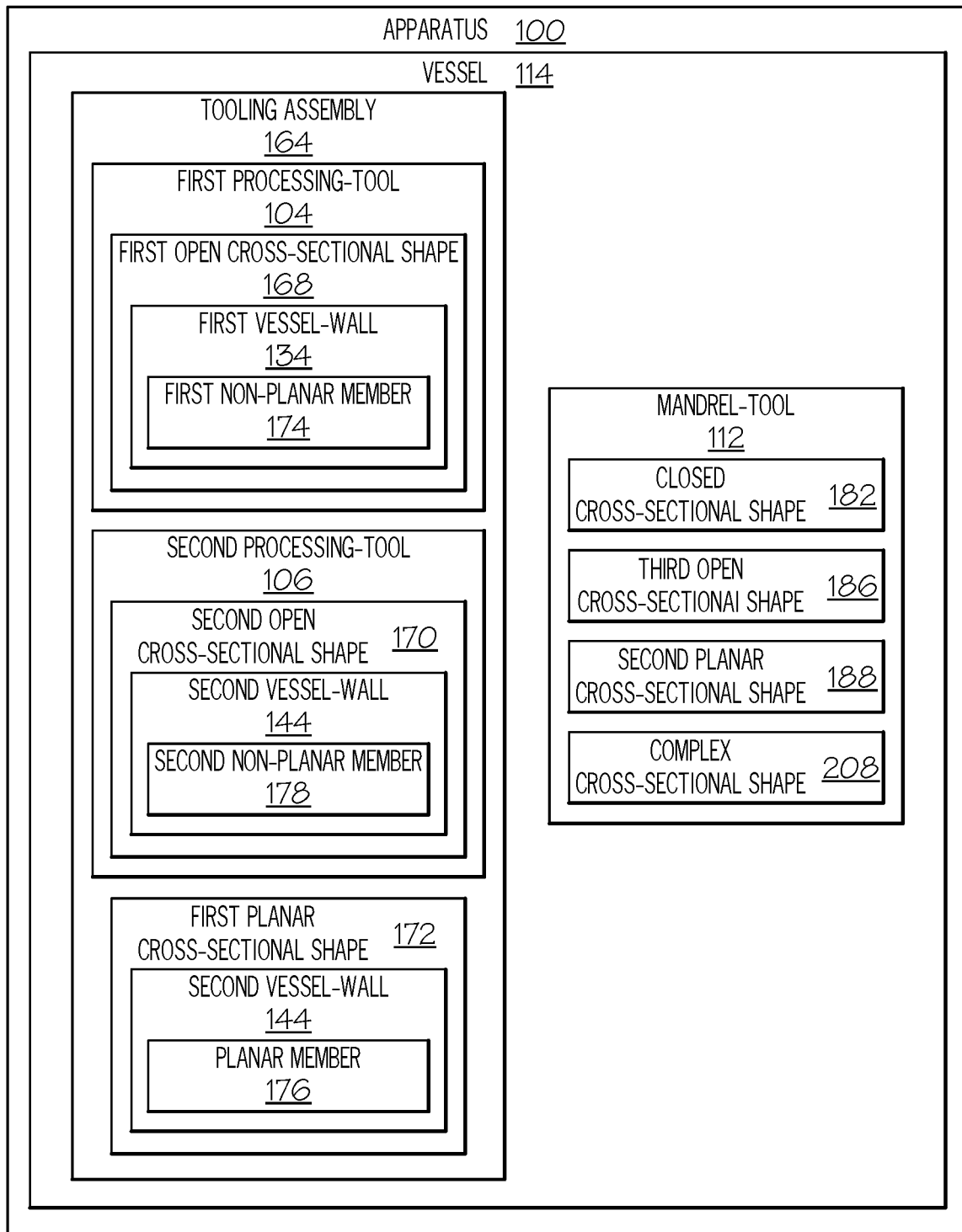
FIG. 24 is a schematic block diagram of an example of the apparatus.

Referring to FIG. 24, in one or more examples, the first processing-tool 104 includes a first open cross-sectional shape 168. In one or more examples, the first processing-tool 104 (e.g., the first open cross-sectional shape 168) is complementary to a first portion of the mandrel-tool 112, such as a first half or a first side of the mandrel-tool 112. In one or more examples, the first vessel-wall 134 includes a first non-planar member 174. The first non-planar member 174 of the first vessel-wall 134 surrounds the first portion of the mandrel-tool 112. Examples of this configuration are illustrated in FIGS. 3-11.

In one or more examples, the second processing-tool 106 includes a second open cross-sectional shape 170. In one or more examples, the second processing-tool 106 (e.g., the second open cross-sectional shape 170) is complementary to a second portion of the mandrel-tool 112, such as a second half or an opposing second side of the mandrel-tool 112. In one or more examples, the second vessel-wall 144 includes a second non-planar member 178. The second non-planar member 178 of the second vessel-wall 144 surrounds the second portion of the mandrel-tool 112. Examples of this configuration are illustrated in FIGS. 3-6.

In one or more examples, the second processing-tool 106 includes a first planar cross-sectional shape 172. In one or more examples, the second processing-tool 106 (e.g., the first planar cross-sectional shape 172) is complementary to a portion of the mandrel-tool 112, such as second half or an opposing second side of the mandrel-tool 112. In one or more examples, the second vessel-wall 144 includes a planar member 176. The planar member 176 supports the mandrel-tool 112. Examples of this configuration are illustrated in FIGS. 7-10.

In one or more examples, the mandrel-tool 112 includes a closed cross-sectional shape 182. The first open cross-sectional shape 168 of the first vessel-wall 134 is complementary to a first portion of the closed cross-sectional shape 182 of the mandrel-tool 112. The second open cross-sectional shape 170 of the second vessel-wall 144 is complementary to a second portion of the closed cross-sectional shape 182 of the mandrel-tool 112.

In one or more examples, the closed cross-sectional shape 182 of the mandrel-tool 112 is circular and the first open cross-sectional shape 168 of the first vessel-wall 134 and the second open cross-sectional shape 170 of the second vessel-wall 144 are each semi-circular. In this example, the circular cross-sectional shape of the mandrel-tool 112 and the semi-circular cross-sectional shape of the first vessel-wall 134 and the second vessel-wall 144 may be used to form the composite structure 102 that has a circular cross-sectional shape, such as a barrel section of an aircraft fuselage. Examples of this configuration are illustrated in FIGS. 3-6.

In one or more examples, the mandrel-tool 112 includes a third open cross-sectional shape 186. The first open cross-sectional shape 168 of the first vessel-wall 134 is complementary to the third open cross-sectional shape 186 of the mandrel-tool 112. The first planar cross-sectional shape 172 of the second vessel-wall 144 is configured to support the mandrel-tool 112 for processing. Examples of this configuration are illustrated in FIGS. 7-10.

In one or more examples, the mandrel-tool 112 includes a second planar cross-sectional shape 188. The first open cross-sectional shape 168 of the first vessel-wall 134 is complementary to a first portion of the second planar cross-sectional shape 188 of the mandrel-tool 112, such as a first surface of the mandrel-tool 112. The first planar cross-sectional shape 172 of the second vessel-wall 144 is complementary to a second portion of the second planar cross-sectional shape 188 of the mandrel-tool 112, such as an opposing second surface of the mandrel-tool 112, to support the mandrel-tool 112.

In one or more examples, the mandrel-tool 112 includes a complex cross-sectional shape 208. The first open cross-sectional shape 168 of the first vessel-wall 134 is complementary to a first portion of the complex cross-sectional shape 208 of the mandrel-tool 112. The second open cross-sectional shape 170 of the second vessel-wall 144 is complementary to a second portion of the complex cross-sectional shape 208 of the mandrel-tool 112. Alternatively, the first planar cross-sectional shape 172 of the second vessel-wall 144 is complementary to a second portion of the complex cross-sectional shape 208 of the mandrel-tool 112, to support the mandrel-tool 112.

Other configurations, such as other cross-sectional shapes of the first processing-tool 104, the second processing-tool 106, and the mandrel-tool 112 are also contemplated.

Referring to FIG. 25, by way of examples, the present disclosure is also directed to a method 1000 of processing a composite structure 102. Referring generally to FIGS. 1-24, in one or more example, implementation of the method 1000 is performed using the disclosed apparatus 100.

The processing being performed according to the disclosed method 1000 includes any suitable manufacturing process, in which heat, pressure, or a combination of heat and pressure is used to process the composite structure 102. In an example, the method 1000 is drawn to a compacting process, in which a composite layup is compacted to remove trapped air. In another example, the method 1000 is drawn to a debulking process, in which a thick laminate is compacted under moderate heat and pressure and/or vacuum to remove most of the air, to ensure seating on the tool, and to prevent wrinkles. In yet another example, the method 1000 is drawn to a curing process, in which properties of a thermosetting resin are changed by chemical reaction under heat and pressure and/or vacuum.

In one or more examples, the method 1000 includes a step of (block 1002) laying-up a composite structure. In one or more examples, the step of (block 1002) laying-up the composite structure includes a step of laying-up the composite structure 102 on the mandrel-tool 112. The mandrel-tool 112 is configured to support the composite structure 102 during processing and to provide shape to at least a portion of the composite structure 102.

In one or more examples, the step of (block 1002) laying-up a composite structure also includes a step of applying the compression bagging 162 over the composite structure 102 and a step of hermetically sealing the compression bagging 162 to the mandrel-tool 112 to seal the composite structure 102 within the compression bagging 162. It can be appreciated that use of the compression bagging 162 is not necessary in every example implementation of the disclosed method 1000.

In one or more examples, the method 1000 includes a step of (block 1004) locating the mandrel-tool 112. In one or more examples, the step of (block 1004) locating the mandrel-tool includes a step of locating the mandrel-tool 112 relative to the tooling assembly 164, such as between the first processing-tool 104 and the second processing-tool 106. In one or more examples, the step of locating the mandrel-tool 112 relative to the tooling assembly 164 is performed using the processing cart 184 that supports the mandrel-tool 112.

In one or more examples, the step of (block 1004) locating the mandrel-tool includes a step of, with the tooling assembly 164 in the open position 108, locating (e.g., moving) the mandrel-tool 112 within the tooling assembly 164, such as between the first processing-tool 104 and the second processing-tool 106.

In one or more examples, the mandrel-tool 112 includes the closed cross-sectional shape 182. The first processing-tool 104 includes the first open cross-sectional shape 168 that is complementary to a first portion of the closed cross-sectional shape 182 of the mandrel-tool 112. The second processing-tool 106 includes the second open cross-sectional shape 170 that is complementary to a second portion of the closed cross-sectional shape 182 of the mandrel-tool 112. The first processing-tool 104 and the second processing-tool 106 surround the composite structure 102 when hermetically sealed together and with the mandrel-tool 112 to form the vessel 114 in the closed position 110.

In one or more examples, the step of (block 1004) locating the mandrel-tool 112 includes a step of, with the tooling assembly 164 in the open position 108, locating the mandrel-tool 112, supporting the composite structure 102, on the second processing-tool 106.

In one or more examples, the mandrel-tool 112 includes the second planar cross-sectional shape 188. The second processing-tool 106 includes the first planar cross-sectional shape 172 that is configured to support the second planar cross-sectional shape 188 of the mandrel-tool 112. The first processing-tool 104 includes the first open cross-sectional shape 168 that is complementary to the shape of the composite structure 102, such as the inner mold line 190 or the outer mold line 192 of the composite structure 102.

In one or more examples, the method 1000 includes a step of (block 1006) closing the tooling assembly 164. In one or more examples, the step of (block 1006) closing the tooling assembly 164 includes a step of positioning the first processing-tool 104 and the second processing-tool 106 of the tooling assembly 164 from the open position 108, in which the first processing-tool 104 and the second processing-tool 106 are spaced apart, to the closed position 110. Generally, the step of (block 1006) closing the tooling assembly 164 (e.g., by positioning the first processing-tool 104 and the second processing-tool 106 in the closed position 110) places the tooling assembly 164 (e.g., the first processing-tool 104 and the second processing-tool 106) in contact with the mandrel-tool 112, supporting the composite structure 102, to form the vessel 114 that surrounds the composite structure 102.

In one or more examples, the step of positioning the tooling assembly 164 from the open position 108 to the closed position 110 includes a step of moving at least one of the first processing-tool 104 and the second processing-tool 106 relative to each other. In an example, at least one of the first processing-tool 104 and the second processing-tool 106 is moved linearly (e.g., approximately horizontally or approximately vertically) relative to the other between the open position 108 and the closed position 110. In another example, the first processing-tool 104 is moved pivotally relative to the second processing-tool 106 between the open position 108 and the closed position 110.

In one or more examples, the method 1000 includes a step of (block 1008) sealing the tooling assembly 164 with the mandrel-tool 112. In one or more examples, the step of (block 1008) sealing the tooling assembly 164 with the mandrel-tool 112 includes a step of hermetically sealing the tooling assembly 164 and the mandrel-tool 112 together. Generally, the step of (block 1006) closing the tooling assembly 164 (e.g., by positioning the first processing-tool 104 and the second processing-tool 106 in the closed position 110) seals the tooling assembly 164 (e.g., seals the first processing-tool 104 and the second processing-tool 106 to each other) and seals the tooling assembly 164 (e.g., the first processing-tool 104 and the second processing-tool 106) with the mandrel-tool 112, supporting the composite structure 102, and, thereby, seals the vessel 114 (e.g., forms a sealed vessel 114) that surrounds the composite structure 102.

In one or more examples, the step of (block 1008) sealing the tooling assembly 164 and the mandrel-tool 112 together includes a step of sealing the first processing-tool 104 to the mandrel-tool 112, supporting the composite structure 102. The step of (block 1008) sealing the tooling assembly 164 and the mandrel-tool 112 together also includes a step of sealing the second processing-tool 106 to the first processing-tool 104 and to the mandrel-tool 112.

In one or more examples, the step of (block 1008) sealing the tooling assembly 164 and the mandrel-tool 112 together includes a step of sealing the first processing-tool 104 to the second processing-tool 106 and to the mandrel-tool 112.

In one or more examples, the step of (block 1008) sealing the tooling assembly 164 and the mandrel-tool 112 together includes a step of sealing the first processing-tool 104 to the mandrel-tool 112.

In one or more examples, the method 1000 includes a step of (block 1010) forming the vessel 114. In one or more examples, the step of (block 1010) forming the vessel 114 is achieved by the step of (block 1006) closing the tooling assembly and the step of (block 1008) sealing the tooling assembly 164 and the mandrel-tool 112 together. The vessel 114 surrounds the composite structure 102.

In one or more examples, the step of (block 1010) forming the vessel 114 includes a step of forming the vessel 114, surrounding the composite structure 102, with the first processing-tool 104, the second processing-tool 106, and the mandrel-tool 112.

In one or more examples, the step of (block 1010) forming the vessel 114 includes a step of forming the vessel 114, surrounding the composite structure 102, with the first processing-tool 104 and the mandrel-tool 112.

In one or more examples, the method 1000 includes a step of (block 1012) processing the composite structure 102. In one or more examples, the step of (block 1012) processing the composite structure 102 includes a step of applying heat. In one or more examples, the step of (block 1012) processing the composite structure 102 includes a step of applying pressure. In one or more examples, the step of (block 1012) processing the composite structure 102 includes applying heat and pressure. In one or more examples, step of (block 1012) processing the composite structure 102 includes a step of applying at least one of pressure and heat to the composite structure 102, for example, to perform a compacting operation, a debulking operation, or a curing operation.

In one or more examples, the step of applying pressure includes the use of positive pressure. In one or more examples, the step of applying pressure to the composite structure 102 includes a step of pressurizing the gas 118 located within the vessel 114. In these examples, the pressurized gas 118 (positive pressure) pushes against the outer surface 212 of the composite structure 102 to compress the composite structure 102 against the outer surface 210 of the mandrel-tool 112.

In one or more examples, the step of applying pressure includes the use of negative pressure. In one or more examples, the step of applying pressure to the composite structure 102 includes a step of applying vacuum (negative pressure) between the compression bagging 162, surrounding the composite structure 102, and the mandrel-tool 112. In these examples, negative pressure evacuates gas between the compression bagging 162 and the outer surface 212 of the composite structure 102 to create a pressure differential. Generally, evacuating gas under the compression bagging 162 (e.g., vacuum bagging) facilitates higher pressure outside of the compression bagging 162 pushing against the compression bagging 162, resulting in compression of the composite structure 102. In these examples, the vacuum system 138 is used to apply vacuum between the compression bagging 162 and the mandrel-tool 112. Additionally, evacuating gas under the compression bagging 162 removes air, water vapor, and/or other volatiles that may escape from the composite structure 102 during processing.

In one or more examples, the step of applying pressure to the composite structure 102 includes a step of applying positive pressure between the first vessel-wall 134 of the first processing-tool 104 and the first conformable membrane 136, coupled to the first vessel-wall 134. For example, the step of applying positive pressure includes a step of increasing atmospheric pressure within the vessel 114, thereby increasing the compression force on the composite structure 102 during processing. In these examples, the pressurized gas 118 in the vessel 114 pushes the first conformable membrane 136 against a portion of the outer surface 212 of the composite structure 102 to compress the composite structure 102 against the outer surface 210 of the mandrel-tool 112. In these examples, the pressurization system 140 is used to pressurize the gas 118 located between the first vessel-wall 134 and the first conformable membrane 136 and to apply pressure to the first conformable membrane 136.

In one or more examples, the step of applying the pressure to the composite structure 102 includes a step of applying vacuum (negative pressure) between the mandrel-tool 112 and the first conformable membrane 136. In these examples, negative pressure evacuates gas between the first conformable membrane 136 and the outer surface 210 of the mandrel-tool 112 to create a pressure differential. Generally, evacuating gas between the first conformable membrane 136 and the outer surface 210 of the mandrel-tool 112 facilitates higher pressure outside of the first conformable membrane 136 pushing against the first conformable membrane 136, resulting in compression of the composite structure 102. In these examples, the vacuum system 138 is used to apply vacuum between the first conformable membrane 136 and the mandrel-tool 112. Additionally, evacuating gas between the first conformable membrane 136 and the mandrel-tool 112 removes air, water vapor, and/or other volatiles that may escape from the composite structure 102 during processing. In these examples, the first conformable membrane 136 may take the place of or serves a similar purpose as the compression bagging 162.

In one or more examples, the step of (block 1012) processing the composite structure 102 includes a step of shaping a portion of the composite structure 102 using the first conformable membrane 136 and/or the compression bagging 162.

In one or more examples, application of positive pressure via the pressurized gas 118 in the vessel 114 pushes the first conformable membrane 136 and/or the compression bagging 162 against a portion of the outer surface 212 of the composite structure 102, which in turn shapes the shapes the outer surface 212 of the composite structure 102.

In one or more examples, a pressure difference between the vessel atmospheric pressure and the vacuum between the first conformable membrane 136 and the mandrel-tool 112 or under the compression bagging 162 results in a compression force being applied to the composite structure 102 during processing.

In one or more examples, the portion of the composite structure 102 shaped by the first conformable membrane 136 or the compression bagging 162 is at least a portion of the outer mold line 192 of the composite structure 102. In these examples, the mandrel-tool 112 shapes the inner mold line 190 of the composite structure 102.

In one or more examples, the portion of the composite structure 102 shaped by the first conformable membrane 136 or the compression bagging 162 is at least a portion of the inner mold line 190 of the composite structure 102. In these examples, the mandrel-tool 112 shapes the outer mold line 192 of the composite structure 102.

In one or more examples, the step of (block 1012) processing the composite structure 102 includes a step of shaping and/or smoothing a portion of the composite structure 102 using the first caul 142, coupled to the first conformable membrane 136. In these examples, the first caul 142 pushes on a portion of the outer surface 212 of the composite structure 102, due to the application of pressure (e.g., positive pressure) and/or vacuum (e.g., negative pressure) on the first conformable membrane 136, to shape and/or smooth the outer surface 212 of the composite structure 102. For example, the first caul 142 is pushed into the composite structure 102 by the pressure differential on either side of the first conformable membrane 136 to shape and/or smooth the outer surface 212 of the composite structure 102.

In one or more examples, the portion of the composite structure 102 shaped by the first caul 142 is at least a portion of the outer mold line 192 of the composite structure 102. In these examples, the mandrel-tool 112 shapes the inner mold line 190 of the composite structure 102.

In one or more examples, the portion of the composite structure 102 shaped by the first caul 142 is at least a portion of the inner mold line 190 of the composite structure 102. In these examples, the mandrel-tool 112 shapes the outer mold line 192 of the composite structure 102.

In one or more examples, the step of applying the pressure to the composite structure 102 includes a step of applying positive pressure between the second vessel-wall 144 of the second processing-tool 106 and the second conformable membrane 146, coupled to the second vessel-wall 144. For example, the step of applying positive pressure includes a step of increasing atmospheric pressure within the vessel 114, thereby increasing the compression force on the composite structure 102 during processing. In these examples, the pressurized gas 118 in the vessel 114 pushes the second conformable membrane 146 against a portion of outer surface 212 of the composite structure 102 to compress the composite structure 102 against the outer surface 210 of the mandrel-tool 112. In these examples, the pressurization system 140 is used to pressurize the gas 118 located between the second vessel-wall 144 and the second conformable membrane 146 and to apply pressure to the first conformable membrane 136.

In one or more examples, the step of applying the pressure to the composite structure 102 includes a step of applying vacuum (negative pressure) between the mandrel-tool 112 and the second conformable membrane 146. In these examples, negative pressure evacuates gas between the second conformable membrane 146 and the outer surface 210 of the mandrel-tool 112 to create a pressure differential. Generally, evacuating gas between the second conformable membrane 146 and the outer surface 210 of the mandrel-tool 112 facilitates higher pressure outside of the second conformable membrane 146 pushing against the second conformable membrane 146, resulting in compression of the composite structure 102. In these examples, the vacuum system 138 is used to apply vacuum between the second conformable membrane 146 and the mandrel-tool 112. Additionally, evacuating gas the second conformable membrane 146 and the mandrel-tool 112 removes air, water vapor, and/or other volatiles that may escape from the composite structure 102 during processing. In these examples, the second conformable membrane 146 may takes the place of or serves a similar purpose as the compression bagging 162

In one or more examples, the step of (block 1012) processing the composite structure 102 includes a step of shaping a portion of the composite structure 102 using the second conformable membrane 146 and/or the compression bagging 162.

In one or more examples, application of positive pressure via the pressurized gas 118 in the vessel 114 pushes the second conformable membrane 146 and/or the compression bagging 162 against a portion of the outer surface 212 of the composite structure 102, which in turn shapes the shapes the outer surface 212 of the composite structure 102.

In one or more examples, a pressure difference between the vessel atmospheric pressure and the vacuum between the second conformable membrane 146 and the mandrel-tool 112 or under the compression bagging 162 results in a compression force being applied to the composite structure 102 during processing.

In one or more examples, the portion of the composite structure 102 shaped by the second conformable membrane 146 is at least a portion of the outer mold line 192 of the composite structure 102. In these examples, the mandrel-tool 112 shapes the inner mold line 190 of the composite structure 102.

In one or more examples, the portion of the composite structure 102 shaped by the second conformable membrane 146 is at least a portion of the inner mold line 190 of the composite structure 102. In these examples, the mandrel-tool 112 shapes the outer mold line 192 of the composite structure 102.

In one or more examples, the step of (block 1012) processing the composite structure 102 includes a step of shaping and/or smoothing a portion of the composite structure 102 using the second caul 148, coupled to the second conformable membrane 146. In these examples, the second caul 148 pushes on a portion of the outer surface 212 of the composite structure 102, due to the application of pressure (e.g., positive pressure) and/or vacuum (e.g., negative pressure) on the second conformable membrane 146, to shape and/or smooth the outer surface 212 of the composite structure 102. For example, the second caul 148 is pushed into the composite structure 102 by the pressure differential on either side of the second conformable membrane 146 to shape and/or smooth the outer surface 212 of the composite structure 102

In one or more examples, the portion of the composite structure 102 shaped by the second caul 148 is at least a portion of the outer mold line 192 of the composite structure 102. In these examples, the mandrel-tool 112 shapes the inner mold line 190 of the composite structure 102.

In one or more examples, the portion of the composite structure 102 shaped by the second caul 148 is at least a portion of the inner mold line 190 of the composite structure 102. In these examples, the mandrel-tool 112 shapes the outer mold line 192 of the composite structure 102.

In one or more examples, the step of (block 1012) processing the composite structure 102, includes a step of heating at least one of the tooling assembly 164, the gas 118 located within the vessel 114, and the mandrel-tool 112 to heat the composite structure 102.

In one or more examples, the step of applying at least one of pressure and heat to the composite structure 102 includes a step of transferring the gas 118 between the first processing-tool 104 and the second processing-tool 106 in the closed position 110. In these examples, the gas 118 is at least one of heated and pressurized. In these examples, the gas 118 is pressurized using the pressurization system 140. In these examples, the gas 118 is heated using the heating system 116.

In one or more examples, the step of (block 1012) processing the composite structure 102 includes a combination of two or more of the following steps: (1) applying pressure between the first vessel-wall 134 and the first conformable membrane 136; (2) applying pressure between the second vessel-wall 144 and the second conformable membrane 146; (3) applying vacuum between the mandrel-tool 112 and the first conformable membrane 136; (4) applying vacuum between the mandrel-tool 112 and the second conformable membrane 146; (5) applying vacuum between the compression bagging 162 and the mandrel-tool 112; (6) heating the tooling assembly 164 (e.g., the first processing-tool 104, the second processing-tool 106, the first conformable membrane 136, the second conformable membrane 146, the first caul 142, and/or the second caul 148); (7) heating the gas 118 located within the vessel 114; and (8) heating the mandrel-tool 112.

In one or more examples, the step of (block 1012) processing the composite structure 102 includes a step of shaping the inner mold line 190 of the composite structure 102 using the mandrel-tool 112 and a step of shaping at least a portion of the outer mold line 192 of the composite structure 102 using the tooling assembly 164.

In one or more examples, the step of (block 1012) processing the composite structure 102 includes a step of shaping the outer mold line 192 of the composite structure 102 using the mandrel-tool 112 and a step of shaping at least a portion of the inner mold line 190 of the composite structure 102 using the tooling assembly 164.

In one or more examples, the mandrel-tool 112 includes the closed cross-sectional shape 182. In one or more examples, the step of (block 1012) processing the composite structure 102 includes a step of pressurizing the interior volume 160 formed by the mandrel-tool 112. Pressurizing the interior volume 160 of the mandrel-tool 112 enables the mandrel-tool 112 to structurally react to the positive pressure applied to the composite structure 102 and the mandrel-tool 112 during processing. In these examples, the interior volume 160 of the mandrel-tool 112 is enclosed using the pair of endcaps 158 and the interior volume 160 of the mandrel-tool 112 is pressurized using the pressurization system 140.

In one or more examples, the mandrel-tool 112 includes the third open cross-sectional shape 186. In one or more examples, the step of (block 1012) processing the composite structure 102 includes a step of pressurizing the interior volume 160 at least partially formed by the mandrel-tool 112. Pressurizing the interior volume 160 of the mandrel-tool 112 enables the mandrel-tool 112 to structurally react to the positive pressure applied to the composite structure 102 and the mandrel-tool 112 during processing. In these examples, the interior volume 160 of the mandrel-tool 112 is enclosed using the pair of endcaps 158 and the interior volume 160 of the mandrel-tool 112 is pressurized using the pressurization system 140.

In one or more examples, the step of (block 1012) processing the composite structure 102 includes a step of compacting the composite structure 102 in response to applying the compacting pressure to the composite structure 102.

In one or more examples, the step of (block 1012) processing the composite structure 102 includes a step of debulking the composite structure 102 in response to applying at least one of debulking pressure and debulking heat to the composite structure 102.

In one or more examples, the step of (block 1012) processing the composite structure 102 includes a step of curing the composite structure 102 in response to applying at least one of curing pressure and curing heat to the composite structure 102.

Accordingly, the disclosed apparatus 100 and method 1000 provide a minimal sized vessel 114 (e.g., processing chamber) by incorporating the mandrel-tool 112 with a tooling assembly 164 that is complementary the mandrel-tool 112 to form the vessel 114 around the composite structure 102. Minimal volume of the vessel 114 results in a significant reduction in heating up and venting of the vessel 114 compared to a conventional autoclave. For example, less volume leads to faster pressurization and faster heat up and cool down during each processing cycle.

Figure 27:
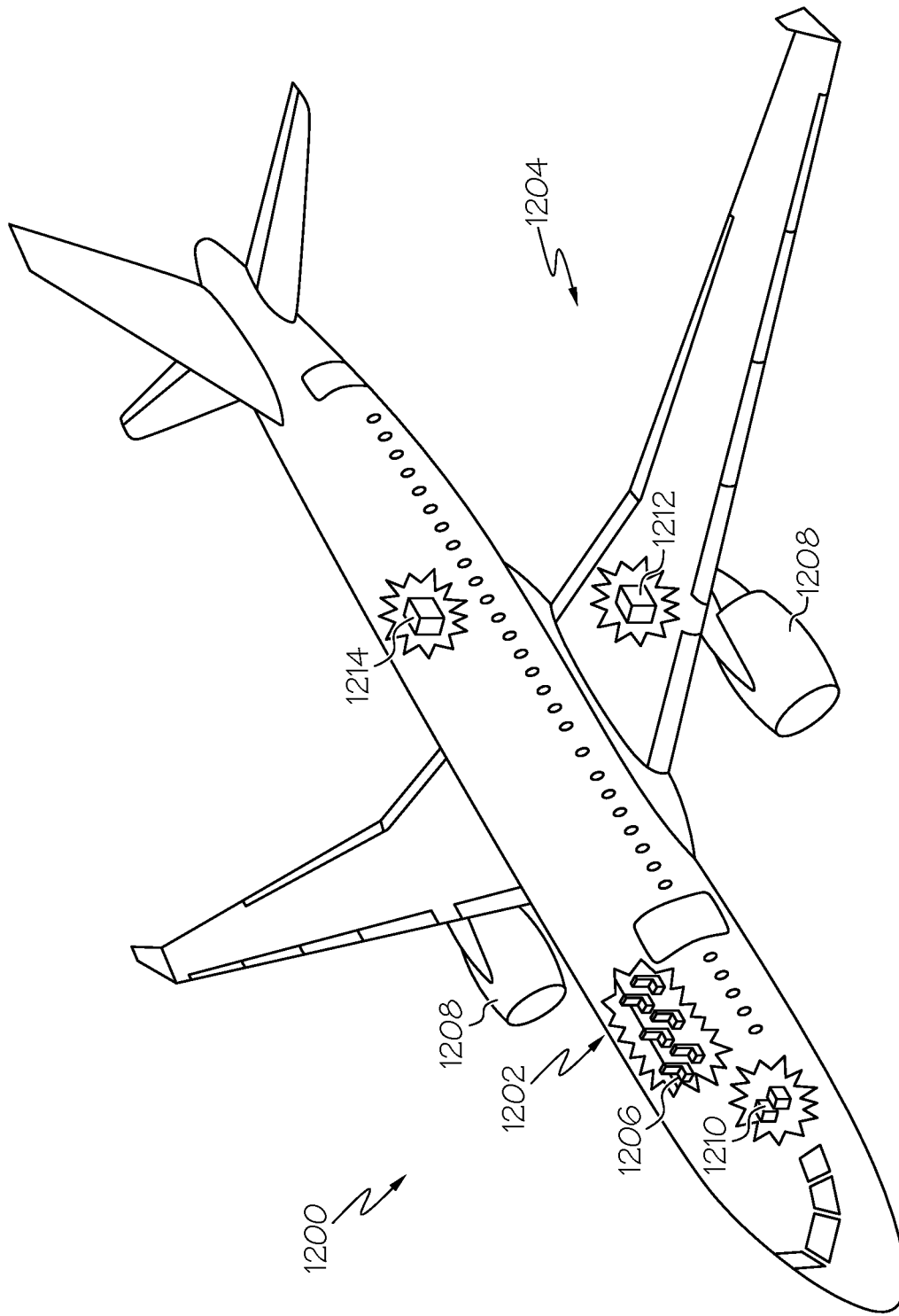
FIG. 27 is a schematic block diagram of an example of an aircraft.

Referring now to FIGS. 26 and 27, examples of the apparatus 100 and the method 1000 may be used in the context of an aircraft manufacturing and service method 1100, as shown in the flow diagram of FIG. 26 and the aircraft 1200, as schematically illustrated in FIG. 27.

Referring to FIG. 27, in one or more examples, the aircraft 1200 includes an airframe 1202 and a plurality of high-level systems 1204. Examples of the high-level systems 1204 include one or more of a propulsion system 1208, an electrical system 1210, a hydraulic system 1212, and an environmental system 1214. In other examples, the aircraft 1200 may include any number of other types of systems, such as a communications system, a guidance system, and the like.

The composite structure 102 manufactured using the apparatus 100 or in accordance with the method 1000 may be any one of a structure, an assembly, a subassembly, a component, a part, or any other portion of the aircraft 1200, such as a portion of the airframe 1202, the interior 1206, and one or more of the high-level systems 1204. For example, the composite structure 102 may be any one of an aircraft spar, a wing section, a fuselage barrel section, an interior panel, an exterior skin panel, and the like.

Referring to FIG. 26, during pre-production, the method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the method 1100 illustrated in FIG. 26 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the apparatus 100 and the method 1000 shown and described herein may be employed during any one or more of the stages of the manufacturing and service method 1100 shown in the flow diagram illustrated by FIG. 26. In an example, implementations of the disclosed apparatus 100 and method 1000 may form a portion of component and subassembly manufacturing (block 1106) and/or system integration (block 1108). For example, assembly of the aircraft 1200, the airframe 1202, and/or components thereof using implementations of the disclosed apparatus 100 and method 1000 may correspond to component and subassembly manufacturing (block 1106) and may be prepared in a manner similar to components or subassemblies prepared while the aircraft 1200 is in service (block 1112). Also, implementations of the disclosed apparatus 100 and method 1000 may be utilized during system integration (block 1108) and certification and delivery (block 1110). Similarly, implementations of the disclosed apparatus 100 and method 1000 may be utilized, for example and without limitation, while the aircraft 1200 is in service (block 1112) and during maintenance and service (block 1114).

Accordingly, referring to FIGS. 1-27, also disclosed is a method of fabricating a portion of the aircraft 1200 (FIG. 11) using the apparatus 100. Also disclosed is a portion of the aircraft 1200 manufactured in accordance with the method 1000.

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to composite structures of other vehicles (e.g., land vehicles, marine vehicles, space vehicles, etc.) and stand-alone structures.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the terms "about" and "approximately" refer to or represent a condition that is close to, but not exactly, the stated condition that still performs the desired function or achieves the desired result. As an example, the terms "about" and "approximately" refer to a condition that is within an acceptable predetermined tolerance or accuracy. For example, the terms "about" and "approximately" refer to a condition that is within 10% of the stated condition.

However, the terms "about" and "approximately" do not exclude a condition that is exactly the stated condition.

In FIGS. 22-24, referred to above, the blocks may represent functional elements, features, or components thereof and lines connecting the various blocks do not necessarily imply any particular structure. Accordingly, modifications, additions and/or omissions may be made to the illustrated structure. Additionally, those skilled in the art will appreciate that not all elements described and illustrated in FIGS. 1-24 and 27, referred to above, need be included in every example and not all elements described herein are necessarily depicted in each illustrative example. Unless otherwise explicitly stated, the schematic illustrations of the examples depicted in FIGS. 1-24 and 27, referred to above, are not meant to imply structural limitations with respect to the illustrative example. Rather, although one illustrative structure is indicated, it is to be understood that the structure may be modified when appropriate.

In FIGS. 25 and 26, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 25 and 26 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the apparatus 100 and the method 1000 have been shown and described, modifications may occur to those skilled in the art upon reading the specification. The present application includes such modifications and is limited only by the scope of the claims.

What is claimed is:

1. An apparatus for processing a composite structure, the apparatus comprising:
a first processing-tool and a second processing-tool that are movable between an open position and a closed position; and
a layup mandrel that supports the composite structure during layup and during processing,
wherein:
in the open position, the first processing-tool and the second processing-tool are separated from each other;
in the closed position, the first processing-tool and the second processing-tool are in contact with and sealed to each other and are in contact with and sealed to the layup mandrel, which is located between the first processing-tool and the second processing-tool, such that the first processing-tool and the second processing-tool form an outer shell wall of a vessel and the layup mandrel forms an inner shell wall of the vessel and a positive pressure is applied to the composite structure against the layup mandrel.

2. The apparatus of claim 1, wherein:
the first processing-tool comprises a first interface-seal;
the first interface-seal is configured to seal a first interface between the first processing-tool and the second processing-tool in the closed position; and
the first interface-seal is configured to seal a second interface between the first processing-tool and the layup mandrel in the closed position.

3. The apparatus of claim 2, wherein:
the second processing-tool comprises a second interface-seal;
the second interface-seal is configured to seal the first interface between the first processing-tool and the second processing-tool in the closed position; and
the second interface-seal is configured to seal a third interface between the second processing-tool and the layup mandrel in the closed position.

4. The apparatus of claim 3, wherein the first interface-seal and the second interface-seal have complementary geometries and are configured to mate with each other in the closed position.

5. The apparatus of claim 3, wherein:
the first processing-tool comprises:
a first vessel-wall that forms a first outer portion of the outer shell wall of the vessel; and
a first interface-surface that forms a perimeter of the first vessel-wall;
the first interface-seal extends along an entirety of the first interface-surface.

6. The apparatus of claim 5, wherein:
the second processing-tool comprises:
a second vessel-wall that forms a second outer portion of the outer shell wall of the vessel; and
a second interface-surface that forms a perimeter of the second vessel-wall; and
the second interface-seal extends along an entirety of the second interface-surface.

7. The apparatus of claim 6, wherein:
the first vessel-wall comprises a first non-planar member; and
the second vessel-wall comprises a second non-planar member.

8. The apparatus of claim 6, wherein:
the first vessel-wall comprises a first non-planar member; and
the second vessel-wall comprises a planar member.

9. The apparatus of claim 1, wherein:
the first processing-tool comprises:
a first vessel-wall, forming a first outer portion of the outer shell wall of the vessel; and a first conformable membrane, coupled to the first vessel-wall and configured to be pressed against the composite structure supported by the layup mandrel.

10. The apparatus of claim 9, further comprising a vacuum system, configured to apply vacuum between the first conformable membrane and the layup mandrel.

11. The apparatus of claim 9, further comprising a pressurization system, configured to apply pressure between the first vessel-wall and the first conformable membrane.

12. The apparatus of claim 9, further comprising a first caul, coupled to the first conformable membrane and configured to shape the composite structure.

13. The apparatus of claim 9, wherein the second processing-tool comprises:
    a second vessel-wall, forming a second outer portion of the outer shell wall of the vessel; and
    a second conformable membrane, coupled to the second vessel-wall and configured to be pressed against the composite structure supported by the layup mandrel.

14. The apparatus of claim 13, further comprising a vacuum system, configured to apply vacuum between the first conformable membrane and the layup mandrel and between the second conformable membrane and the layup mandrel.

15. The apparatus of claim 13, further comprising a pressurization system, configured to apply pressure between the first vessel-wall and the first conformable membrane and between the second vessel-wall and the second conformable membrane.

16. The apparatus of claim 13, further comprising a second caul, coupled to the second conformable membrane and configured to shape the composite structure.

17. The apparatus of claim 13, wherein:
    the first processing-tool comprises a first bulkhead, coupled to the first vessel-wall and comprising a first aperture;
    the second processing-tool comprises a second bulkhead, coupled to the second vessel-wall and comprising a second aperture; and
    in the closed position, the first bulkhead and the second bulkhead contact each other so that the first aperture and the second aperture align with each other for passage of a gas between the first processing-tool and the second processing-tool.

18. The apparatus of claim 1, further comprising a heating system, configured to heat at least one of the first processing-tool, the second processing-tool, a gas located within the vessel, and the layup mandrel.

19. The apparatus of claim 1, further comprising a pressurization system, configured to pressurize a gas located within the vessel.

20. The apparatus of claim 1, further comprising:
    a heating system, configured to heat at least one of the first processing-tool, the second processing-tool, a gas located within the vessel, and the layup mandrel; and
    a pressurization system, configured to pressurize the gas located within the vessel.

21. The apparatus of claim 1, further comprising a pair of endcaps, configured to seal an interior volume of the layup mandrel for pressurizing the interior volume.

22. The apparatus of claim 1, further comprising compression bagging, configured to surround the composite structure, wherein vacuum is applied between the compression bagging and the layup mandrel.

23. The apparatus of claim 1, wherein the first processing-tool comprises a first open cross-sectional shape.

24. An apparatus for processing a composite structure, the apparatus comprising:
    a layup mandrel, configured to support the composite structure during layup and processing;
    a first processing-tool and a second processing-tool that are movable between an open position and a closed position, wherein:
        in the open position, the first processing-tool and the second processing-tool are separated from each other and from the layup mandrel; and
        in the closed position, the first processing-tool and the second processing- tool are in contact with each other and with the layup mandrel; and
    an interface-seal, wherein:
        in the closed position, the first processing-tool and the second processing- tool form an outer shell wall of a vessel and the layup mandrel forms an inner shell wall of the vessel; and
        in the closed position, the interface-seal is configured to seal the first processing-tool, the second processing-tool, and the layup mandrel together to form the vessel, surrounding the composite structure,
    wherein, in the closed position, a positive pressure is applied within the vessel to compact the composite structure against the layup mandrel.

25. An apparatus for processing a composite structure, the apparatus comprising:
    a processing-tool, movable relative to a layup mandrel between an open position and a closed position with the layup mandrel, wherein:
        the layup mandrel supports the composite structure during layup and processing;
        in the closed position, the processing-tool is in contact with the layup mandrel to form a shell wall of a vessel;
        in the closed position, the processing-tool is sealed to the layup mandrel to seal the vessel; and
        in the closed position, the processing-tool applies positive pressure within the vessel to compact the composite structure against the layup mandrel, enclosed within the vessel.

* * * * *